US006655773B2

(12) United States Patent
Gotoh et al.

(10) Patent No.: US 6,655,773 B2
(45) Date of Patent: *Dec. 2, 2003

(54) GRAY SCALE PATTERN AND RECORDING METHOD AND RECORDING APPARATUS EMPLOYING THE GRAY SCALE PATTERN

(75) Inventors: Fumihiro Gotoh, Kawasaki (JP); Hiroshi Tajika, Yokohama (JP); Toshiharu Inui, Yokohama (JP); Yuji Akiyama, Yokohama (JP); Miyuki Fujita, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/365,077

(22) Filed: Dec. 28, 1994

(65) Prior Publication Data

US 2002/0024548 A1 Feb. 28, 2002

(30) Foreign Application Priority Data

Dec. 28, 1993 (JP) .............................................. 5-337470
Dec. 14, 1994 (JP) .............................................. 6-310555

(51) Int. Cl.[7] ................................................ B41J 2/01
(52) U.S. Cl. ...................................................... 347/15
(58) Field of Search ............................. 347/15, 43, 41; 358/298, 429

(56) References Cited

U.S. PATENT DOCUMENTS

| 4,084,259 A | * | 4/1978 | Cahill et al. ................. 358/429 |
|---|---|---|---|
| 4,313,124 A | | 1/1982 | Hara ............................ 347/57 |
| 4,345,262 A | | 8/1982 | Shirato et al. ................. 347/10 |
| 4,459,600 A | | 7/1984 | Sato et al. ..................... 347/47 |
| 4,463,359 A | | 7/1984 | Ayata et al. ................... 347/56 |
| 4,558,333 A | | 12/1985 | Sugitani et al. ................ 347/65 |
| 4,608,577 A | | 8/1986 | Hori ............................. 347/66 |
| 4,686,538 A | * | 8/1987 | Kouzato ....................... 347/15 |
| 4,723,129 A | | 2/1988 | Endo et al. .................... 347/56 |
| 4,740,796 A | | 4/1988 | Endo et al. .................... 347/56 |
| 4,989,016 A | * | 1/1991 | Gatten et al. ................... 347/2 |
| 5,366,835 A | * | 11/1994 | Namkiki et al. ............... 430/30 |
| 5,416,612 A | * | 5/1995 | Ingraham et al. ........... 358/501 |

FOREIGN PATENT DOCUMENTS

| JP | 54056847 | 5/1979 |
|---|---|---|
| JP | 59123670 | 7/1984 |
| JP | 59138461 | 8/1984 |
| JP | 60071260 | 4/1985 |
| JP | 5-169720 | 7/1993 |

* cited by examiner

*Primary Examiner*—Craig Hallacher
(74) *Attorney, Agent, or Firm*—Fitzpatrick, Cella, Harper & Scinto

(57) ABSTRACT

The present invention is designed to make uniform frequencies with which individual recording elements of a multihead are used in a recording apparatus for performing gray scale recording by controlling a number of dots recorded in a unit area. A gray scale pattern used to display gray scale is a pattern in which a plurality of blocks each comprising a dot concentration type gray scale pattern having a size smaller than that of the gray scale pattern is dispersed. The maximum difference between numbers of times the recording elements in the range of the gray scale pattern are used can be restricted within twice, and individual nozzles can be used uniformly. Consequently, imbalance of changes in the recording elements with time, caused by the differences between the frequencies with which the recording elements are used, can be restricted, thus restricting irregularities on an image.

19 Claims, 30 Drawing Sheets

GRAY SCALE PATTERN

GRAY SCALE CHARACTERISTICS

FIG. 2A

| 43 | 27 | 39 | 23 | 42 | 26 | 38 | 22 |
| --- | --- | --- | --- | --- | --- | --- | --- |
| 11 | 59 | 7 | 55 | 10 | 58 | 6 | 54 |
| 35 | 19 | 47 | 31 | 34 | 18 | 46 | 30 |
| 3 | 51 | 15 | 63 | 2 | 50 | 14 | 62 |
| 41 | 25 | 37 | 21 | 44 | 28 | 40 | 24 |
| 9 | 57 | 5 | 53 | 12 | 60 | 8 | 56 |
| 33 | 17 | 45 | 29 | 36 | 20 | 48 | 32 |
| 1 | 49 | 13 | 61 | 4 | 52 | 16 | 64 |

BAYER TYPE

FIG. 2B

| 64 | 56 | 48 | 36 | 40 | 52 | 60 | 63 |
| --- | --- | --- | --- | --- | --- | --- | --- |
| 57 | 44 | 28 | 20 | 24 | 32 | 43 | 55 |
| 49 | 29 | 16 | 8 | 12 | 15 | 27 | 47 |
| 37 | 21 | 9 | 4 | 3 | 7 | 19 | 35 |
| 33 | 17 | 5 | 1 | 2 | 11 | 23 | 39 |
| 45 | 25 | 13 | 10 | 6 | 14 | 31 | 51 |
| 53 | 41 | 30 | 22 | 18 | 26 | 42 | 59 |
| 61 | 58 | 50 | 38 | 34 | 46 | 54 | 62 |

FATTING TYPE

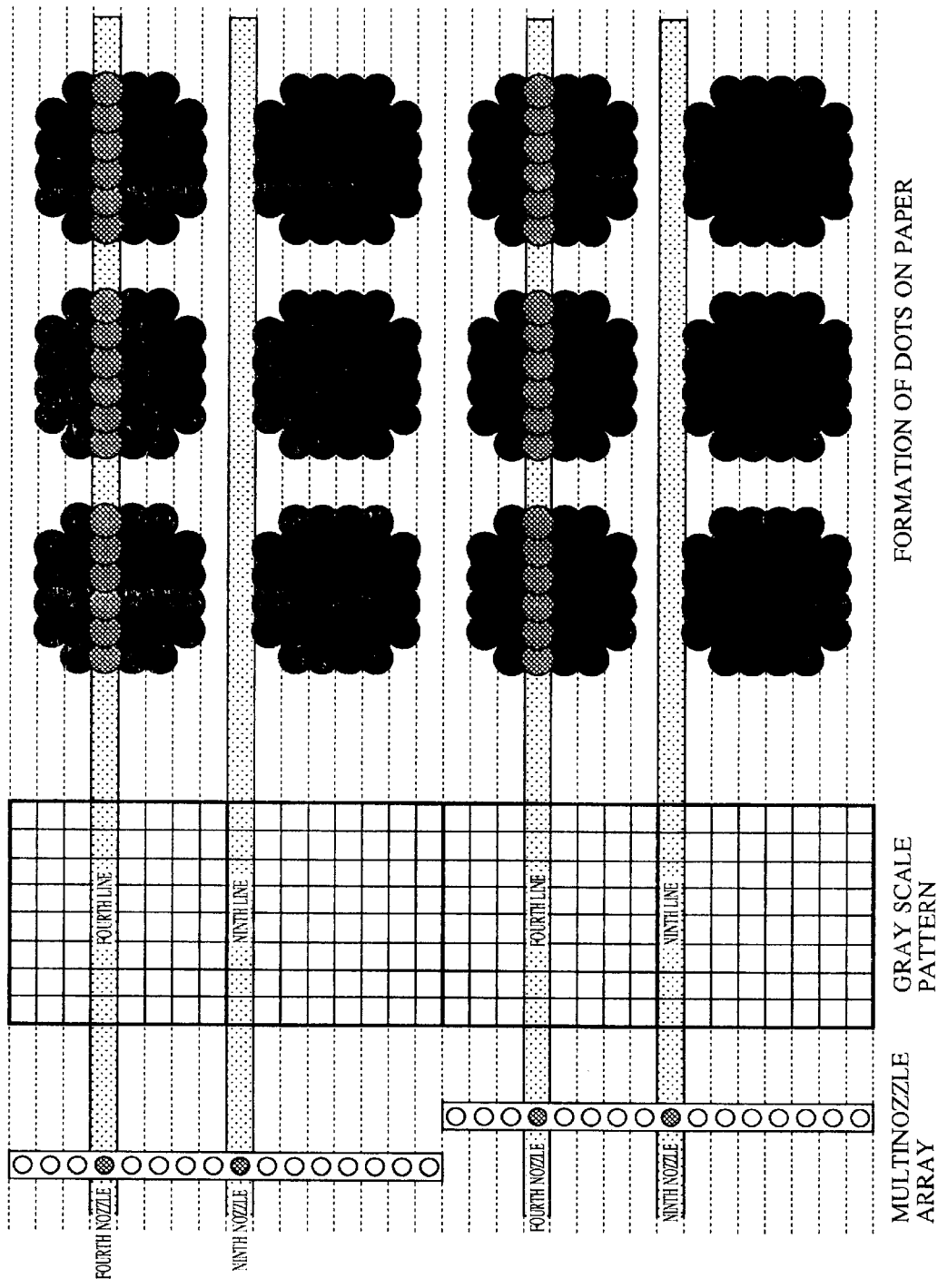

FIG. 8

| 26 | 46 | 62 | 38 | 39 | 63 | 47 | 27 |
|---|---|---|---|---|---|---|---|
| 18 | 30 | 54 | 50 | 51 | 55 | 31 | 19 |
| 12 | 14 | 34 | 58 | 59 | 35 | 15 | 8 |
| 3 | 6 | 22 | 42 | 43 | 23 | 9 | 4 |
| 2 | 10 | 24 | 44 | 41 | 21 | 5 | 1 |
| 7 | 16 | 36 | 60 | 57 | 33 | 13 | 11 |
| 20 | 32 | 56 | 52 | 49 | 53 | 29 | 17 |
| 28 | 48 | 64 | 40 | 37 | 61 | 45 | 25 |
| 39 | 63 | 47 | 27 | 26 | 46 | 62 | 38 |
| 51 | 55 | 31 | 19 | 18 | 30 | 54 | 50 |
| 59 | 35 | 15 | 8 | 12 | 14 | 34 | 58 |
| 43 | 23 | 9 | 4 | 3 | 6 | 22 | 42 |
| 41 | 21 | 5 | 1 | 2 | 10 | 24 | 44 |
| 57 | 33 | 13 | 11 | 7 | 16 | 36 | 60 |
| 49 | 53 | 29 | 17 | 20 | 32 | 56 | 52 |
| 37 | 61 | 45 | 25 | 28 | 48 | 64 | 40 |

FIG. 10

| 30 | 46 | 58 | 63 | 31 | 47 | 59 | 62 |
|----|----|----|----|----|----|----|----|
| 14 | 10 | 26 | 35 | 15 | 11 | 27 | 34 |
| 2  | 6  | 42 | 19 | 3  | 7  | 43 | 18 |
| 38 | 22 | 54 | 51 | 39 | 23 | 55 | 50 |
| 64 | 32 | 48 | 60 | 61 | 29 | 45 | 57 |
| 36 | 16 | 12 | 28 | 31 | 13 | 9  | 25 |
| 20 | 4  | 8  | 44 | 17 | 1  | 5  | 41 |
| 52 | 40 | 24 | 56 | 49 | 37 | 21 | 53 |
| 31 | 47 | 59 | 62 | 30 | 46 | 58 | 63 |
| 15 | 11 | 27 | 34 | 14 | 10 | 26 | 35 |
| 3  | 7  | 43 | 18 | 2  | 6  | 42 | 19 |
| 39 | 23 | 55 | 50 | 38 | 22 | 54 | 51 |
| 61 | 29 | 45 | 57 | 64 | 32 | 48 | 60 |
| 31 | 13 | 9  | 25 | 36 | 16 | 12 | 28 |
| 17 | 1  | 5  | 41 | 20 | 4  | 8  | 44 |
| 49 | 37 | 21 | 53 | 52 | 40 | 24 | 56 |

FIG. 11
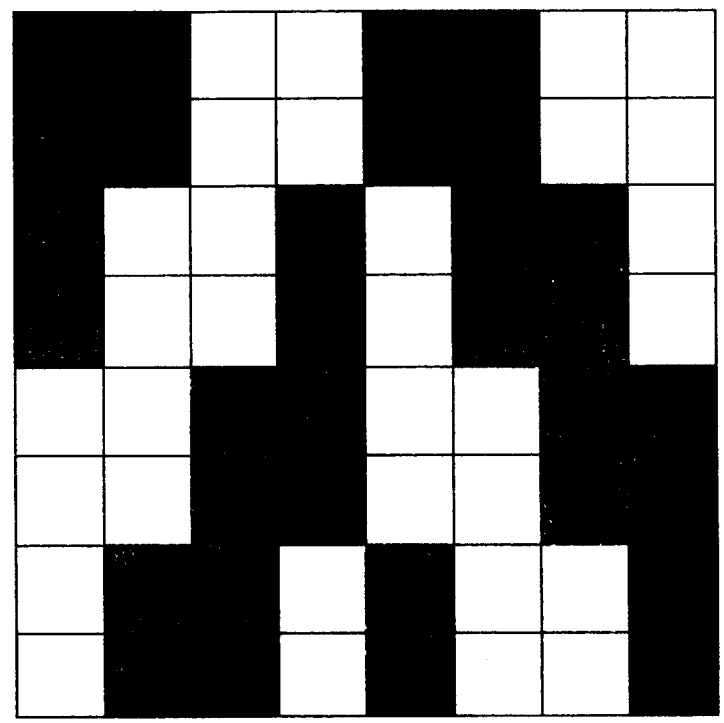
SECOND PASS
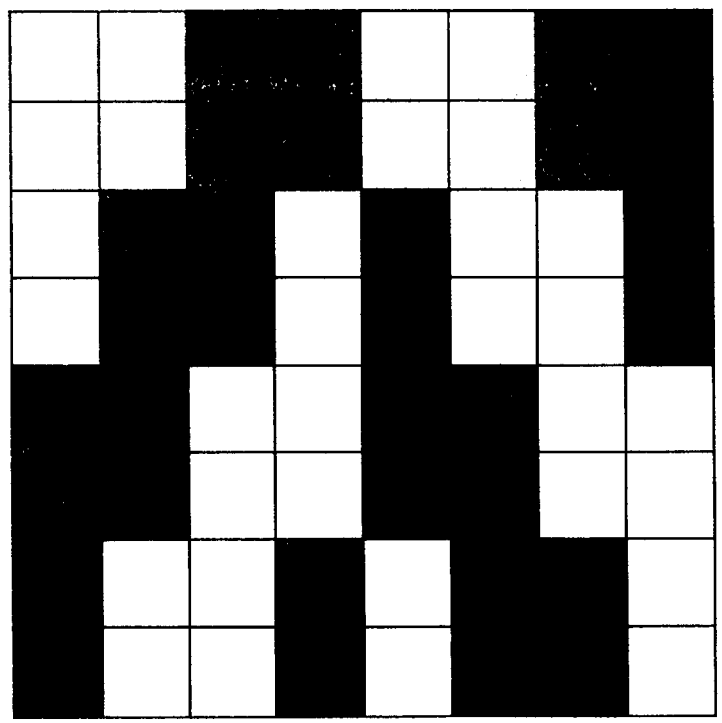
FIRST PASS

FIG. 14

| GRAY LEVEL | FIRST LINE | SECOND LINE | THIRD LINE | FOURTH LINE | FIFTH LINE | SIXTH LINE | SEVENTH LINE | EIGHTH LINE |
|---|---|---|---|---|---|---|---|---|
| 1 | 0 | 0 | 0 | 1 | 0 | 0 | 0 | 0 |
| 2 | 0 | 0 | 0 | 1 | 1 | 0 | 0 | 0 |
| 3 | 0 | 0 | 0 | 1 | 2 | 0 | 0 | 0 |
| 4 | 0 | 0 | 0 | 2 | 2 | 0 | 0 | 0 |
| 5 | 0 | 0 | 1 | 2 | 2 | 0 | 0 | 0 |
| 6 | 0 | 0 | 1 | 2 | 3 | 0 | 0 | 0 |
| 7 | 0 | 0 | 1 | 2 | 3 | 1 | 0 | 0 |
| 8 | 0 | 0 | 1 | 3 | 3 | 1 | 0 | 0 |
| 9 | 0 | 0 | 2 | 3 | 3 | 1 | 0 | 0 |
| 10 | 0 | 0 | 2 | 4 | 3 | 1 | 0 | 0 |
| 11 | 0 | 0 | 2 | 4 | 3 | 2 | 0 | 0 |
| 12 | 0 | 0 | 2 | 4 | 4 | 2 | 0 | 0 |
| 13 | 0 | 0 | 3 | 4 | 4 | 2 | 0 | 0 |
| 14 | 0 | 0 | 3 | 4 | 4 | 3 | 0 | 0 |
| 15 | 0 | 0 | 3 | 4 | 4 | 4 | 0 | 0 |
| 16 | 0 | 0 | 4 | 4 | 4 | 4 | 0 | 0 |
| 17 | 0 | 1 | 4 | 4 | 4 | 4 | 0 | 0 |
| 18 | 0 | 1 | 4 | 4 | 5 | 4 | 0 | 0 |
| 19 | 0 | 1 | 4 | 4 | 5 | 4 | 1 | 0 |
| 20 | 0 | 1 | 4 | 5 | 5 | 4 | 1 | 0 |
| 21 | 0 | 2 | 4 | 5 | 5 | 4 | 1 | 0 |
| 22 | 0 | 2 | 4 | 6 | 5 | 4 | 1 | 0 |
| 23 | 0 | 2 | 4 | 6 | 5 | 4 | 2 | 0 |
| 24 | 0 | 2 | 4 | 6 | 6 | 4 | 2 | 0 |
| 25 | 0 | 3 | 4 | 6 | 6 | 4 | 2 | 0 |
| 26 | 0 | 3 | 4 | 6 | 6 | 5 | 2 | 0 |
| 27 | 0 | 3 | 4 | 6 | 6 | 5 | 3 | 0 |
| 28 | 0 | 3 | 5 | 6 | 6 | 5 | 3 | 0 |
| 29 | 0 | 4 | 5 | 6 | 6 | 5 | 3 | 0 |
| 30 | 0 | 4 | 6 | 6 | 6 | 5 | 3 | 0 |
| 31 | 0 | 4 | 6 | 6 | 6 | 5 | 4 | 0 |
| 32 | 0 | 4 | 6 | 6 | 6 | 6 | 4 | 0 |
| 33 | 1 | 4 | 6 | 6 | 6 | 6 | 4 | 0 |
| 34 | 1 | 4 | 6 | 6 | 7 | 6 | 4 | 0 |
| 35 | 1 | 4 | 6 | 6 | 7 | 6 | 4 | 1 |
| 36 | 1 | 4 | 6 | 7 | 7 | 6 | 4 | 1 |
| 37 | 2 | 4 | 6 | 7 | 7 | 6 | 4 | 1 |
| 38 | 2 | 4 | 6 | 8 | 7 | 6 | 4 | 1 |
| 39 | 2 | 4 | 6 | 8 | 8 | 6 | 4 | 2 |
| 40 | 2 | 4 | 6 | 8 | 8 | 6 | 4 | 2 |
| 41 | 2 | 5 | 6 | 8 | 8 | 6 | 4 | 2 |
| 42 | 2 | 5 | 6 | 8 | 8 | 6 | 5 | 2 |
| 43 | 2 | 5 | 6 | 8 | 8 | 6 | 6 | 2 |
| 44 | 2 | 6 | 6 | 8 | 8 | 6 | 6 | 2 |
| 45 | 3 | 6 | 6 | 8 | 8 | 6 | 6 | 2 |
| 46 | 3 | 6 | 6 | 8 | 8 | 7 | 6 | 2 |
| 47 | 3 | 6 | 6 | 8 | 8 | 7 | 6 | 3 |
| 48 | 3 | 6 | 7 | 8 | 8 | 7 | 6 | 3 |
| 49 | 4 | 6 | 7 | 8 | 8 | 7 | 6 | 3 |
| 50 | 4 | 6 | 8 | 8 | 8 | 7 | 6 | 3 |
| 51 | 4 | 6 | 8 | 8 | 8 | 7 | 6 | 4 |
| 52 | 4 | 6 | 8 | 8 | 8 | 8 | 6 | 4 |
| 53 | 5 | 6 | 8 | 8 | 8 | 8 | 6 | 4 |
| 54 | 5 | 6 | 8 | 8 | 8 | 8 | 7 | 4 |
| 55 | 5 | 6 | 8 | 8 | 8 | 8 | 7 | 5 |
| 56 | 5 | 7 | 8 | 8 | 8 | 8 | 7 | 5 |
| 57 | 6 | 7 | 8 | 8 | 8 | 8 | 7 | 5 |
| 58 | 6 | 8 | 8 | 8 | 8 | 8 | 7 | 5 |
| 59 | 6 | 8 | 8 | 8 | 8 | 8 | 7 | 6 |
| 60 | 6 | 8 | 8 | 8 | 8 | 8 | 8 | 6 |
| 61 | 7 | 8 | 8 | 8 | 8 | 8 | 8 | 6 |
| 62 | 7 | 8 | 8 | 8 | 8 | 8 | 8 | 7 |
| 63 | 7 | 8 | 8 | 8 | 8 | 8 | 8 | 8 |
| 64 | 8 | 8 | 8 | 8 | 8 | 8 | 8 | 8 |
| TOTAL NUMBER OF RECORDED DOTS | 121 | 229 | 321 | 381 | 381 | 317 | 221 | 109 |
| Max/Min | 3.4954128 | | Max/260 | 1.4653846 | | | | |

FIG. 15

| GRAY LEVEL | FIRST NOZZLE | SECOND NOZZLE | THIRD NOZZLE | FOURTH NOZZLE | FIFTH NOZZLE | SIXTH NOZZLE | SEVENTH NOZZLE | EIGHTH NOZZLE |
|---|---|---|---|---|---|---|---|---|
| 1 | 0 | 1 | 0 | 0 | 0 | 0 | 0 | 0 |
| 2 | 0 | 1 | 0 | 0 | 1 | 0 | 0 | 0 |
| 3 | 0 | 1 | 0 | 0 | 1 | 1 | 0 | 0 |
| 4 | 1 | 1 | 0 | 0 | 1 | 1 | 0 | 0 |
| 5 | 1 | 1 | 1 | 0 | 1 | 1 | 0 | 0 |
| 6 | 1 | 1 | 1 | 1 | 1 | 1 | 0 | 0 |
| 7 | 1 | 1 | 1 | 1 | 1 | 1 | 1 | 0 |
| 8 | 1 | 1 | 1 | 1 | 1 | 1 | 1 | 1 |
| 9 | 1 | 1 | 2 | 1 | 1 | 1 | 1 | 1 |
| 10 | 1 | 1 | 2 | 2 | 1 | 1 | 1 | 1 |
| 11 | 1 | 1 | 2 | 2 | 1 | 1 | 2 | 1 |
| 12 | 1 | 1 | 2 | 2 | 1 | 1 | 2 | 2 |
| 13 | 1 | 2 | 2 | 2 | 1 | 1 | 2 | 2 |
| 14 | 1 | 2 | 2 | 2 | 2 | 1 | 2 | 2 |
| 15 | 1 | 2 | 2 | 2 | 2 | 2 | 2 | 2 |
| 16 | 2 | 2 | 2 | 2 | 2 | 2 | 2 | 2 |
| 17 | 3 | 2 | 2 | 2 | 2 | 2 | 2 | 2 |
| 18 | 3 | 2 | 3 | 2 | 2 | 2 | 2 | 2 |
| 19 | 3 | 2 | 3 | 2 | 3 | 2 | 2 | 2 |
| 20 | 3 | 2 | 3 | 2 | 3 | 2 | 3 | 2 |
| 21 | 3 | 2 | 4 | 2 | 3 | 2 | 3 | 2 |
| 22 | 3 | 2 | 4 | 2 | 4 | 2 | 3 | 2 |
| 23 | 3 | 2 | 4 | 2 | 4 | 2 | 4 | 2 |
| 24 | 4 | 2 | 4 | 2 | 4 | 2 | 4 | 2 |
| 25 | 4 | 3 | 4 | 3 | 4 | 2 | 4 | 2 |
| 26 | 4 | 3 | 4 | 3 | 4 | 3 | 4 | 2 |
| 27 | 4 | 3 | 4 | 3 | 4 | 3 | 4 | 3 |
| 28 | 4 | 3 | 4 | 3 | 4 | 3 | 4 | 3 |
| 29 | 4 | 4 | 4 | 3 | 4 | 3 | 4 | 3 |
| 30 | 4 | 4 | 4 | 4 | 4 | 3 | 4 | 3 |
| 31 | 4 | 4 | 4 | 4 | 4 | 4 | 4 | 3 |
| 32 | 4 | 4 | 4 | 4 | 4 | 4 | 4 | 4 |
| 33 | 5 | 4 | 4 | 4 | 4 | 4 | 4 | 4 |
| 34 | 5 | 4 | 5 | 4 | 4 | 4 | 4 | 4 |
| 35 | 5 | 4 | 5 | 4 | 5 | 4 | 4 | 4 |
| 36 | 5 | 4 | 5 | 4 | 5 | 4 | 5 | 4 |
| 37 | 5 | 5 | 5 | 4 | 5 | 4 | 5 | 4 |
| 38 | 5 | 5 | 5 | 5 | 5 | 4 | 5 | 4 |
| 39 | 5 | 5 | 5 | 5 | 5 | 5 | 5 | 4 |
| 40 | 5 | 5 | 5 | 5 | 5 | 5 | 5 | 5 |
| 41 | 5 | 5 | 5 | 6 | 5 | 5 | 5 | 5 |
| 42 | 5 | 5 | 5 | 6 | 5 | 6 | 5 | 5 |
| 43 | 5 | 5 | 5 | 6 | 5 | 6 | 5 | 6 |
| 44 | 5 | 6 | 5 | 6 | 5 | 6 | 5 | 6 |
| 45 | 5 | 6 | 6 | 6 | 5 | 6 | 5 | 6 |
| 46 | 5 | 6 | 6 | 6 | 6 | 6 | 5 | 6 |
| 47 | 5 | 6 | 6 | 6 | 6 | 6 | 6 | 6 |
| 48 | 6 | 6 | 6 | 6 | 6 | 6 | 6 | 6 |
| 49 | 7 | 6 | 6 | 6 | 6 | 6 | 6 | 6 |
| 50 | 7 | 6 | 7 | 6 | 6 | 6 | 6 | 6 |
| 51 | 7 | 6 | 7 | 6 | 7 | 6 | 6 | 6 |
| 52 | 7 | 6 | 7 | 6 | 7 | 6 | 7 | 6 |
| 53 | 7 | 6 | 7 | 7 | 7 | 6 | 7 | 6 |
| 54 | 7 | 6 | 7 | 7 | 7 | 7 | 7 | 6 |
| 55 | 7 | 6 | 7 | 7 | 7 | 7 | 7 | 7 |
| 56 | 7 | 7 | 7 | 7 | 7 | 7 | 7 | 7 |
| 57 | 7 | 7 | 7 | 8 | 7 | 7 | 7 | 7 |
| 58 | 7 | 7 | 7 | 8 | 7 | 8 | 7 | 7 |
| 59 | 7 | 7 | 7 | 8 | 7 | 8 | 7 | 8 |
| 60 | 7 | 8 | 7 | 8 | 7 | 8 | 7 | 8 |
| 61 | 8 | 8 | 7 | 8 | 7 | 8 | 7 | 8 |
| 62 | 8 | 8 | 8 | 8 | 7 | 8 | 7 | 8 |
| 63 | 8 | 8 | 8 | 8 | 8 | 8 | 7 | 8 |
| 64 | 8 | 8 | 8 | 8 | 8 | 8 | 8 | 8 |
| TOTAL NUMBER OF RECORDED DOTS | 268 | 252 | 276 | 268 | 268 | 252 | 260 | 244 |
| Max/Min | 1.1311475 | | Max/260 | 1.0615385 | | | | |

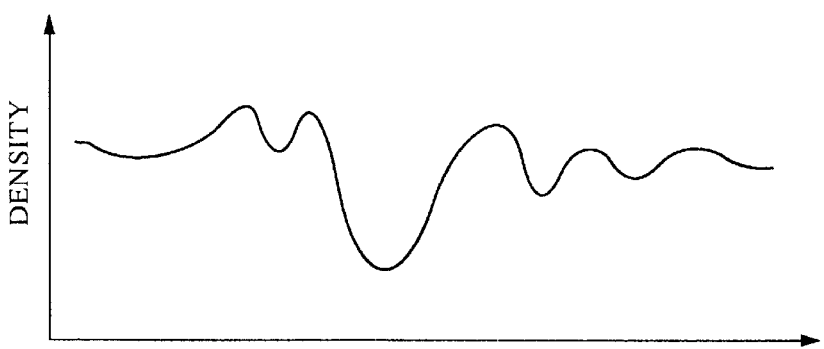
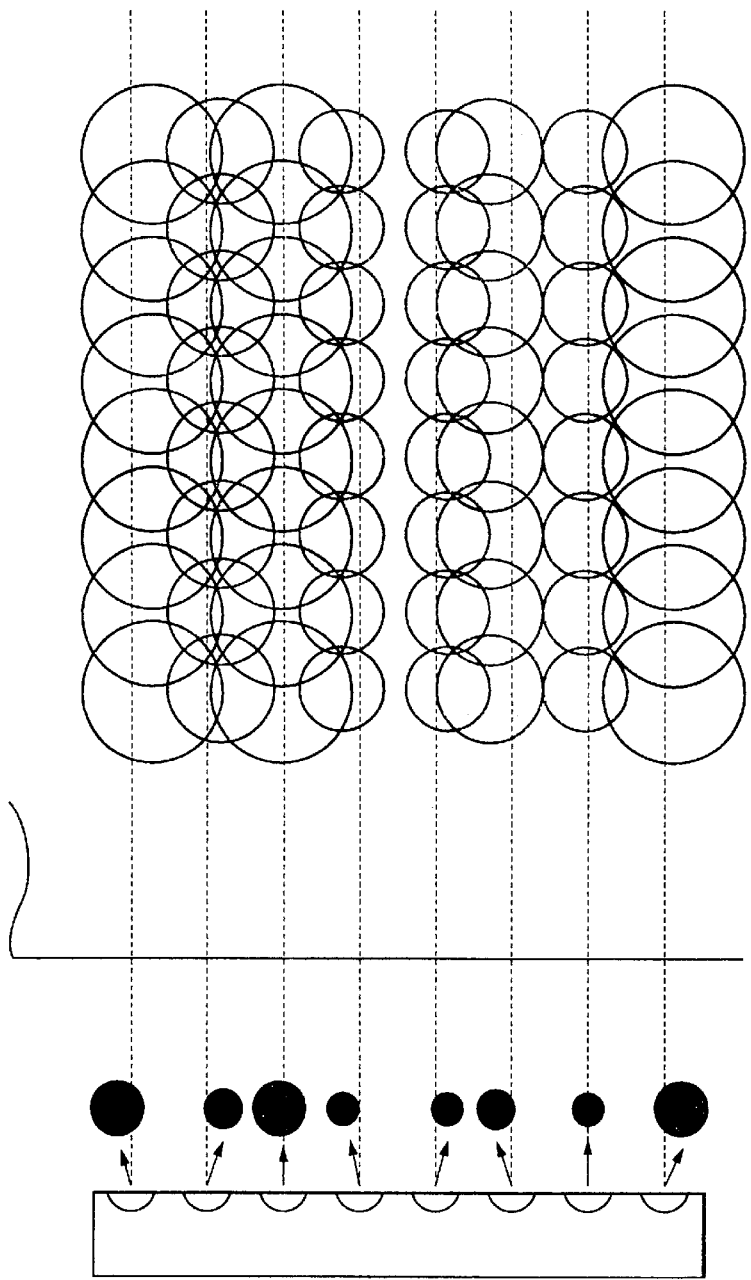

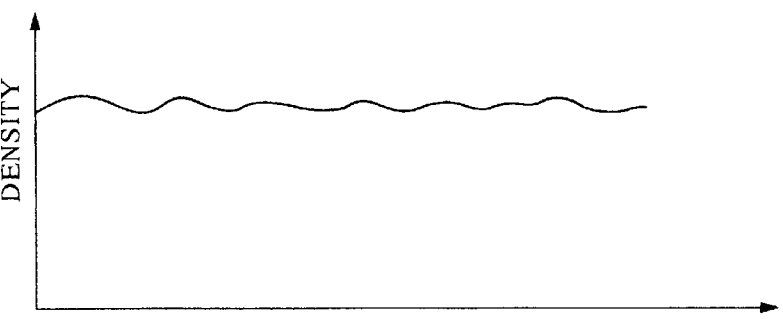
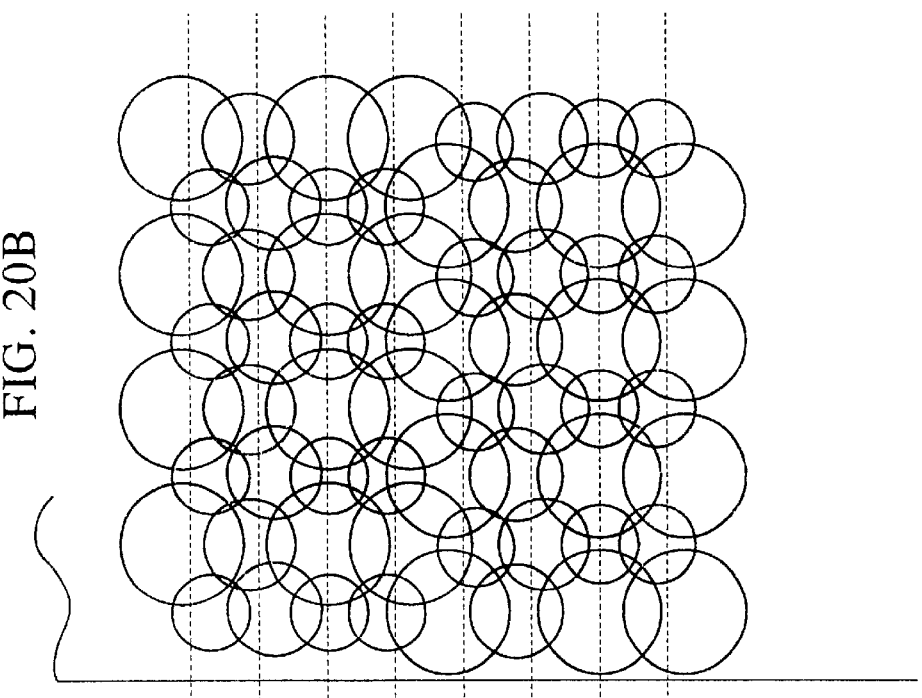
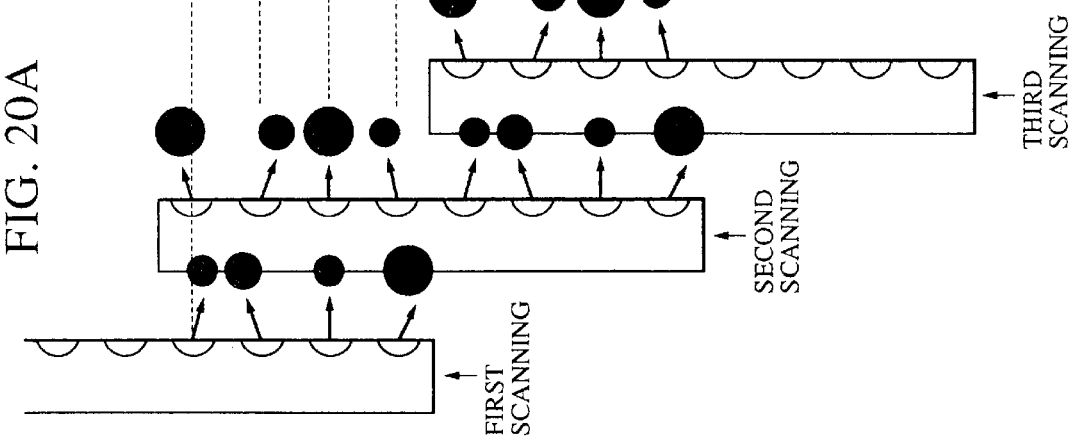

⊘ CHECKERBOARD PATTERN

◯ INVERTED CHECKERBOARD PATTERN

FIG. 23A

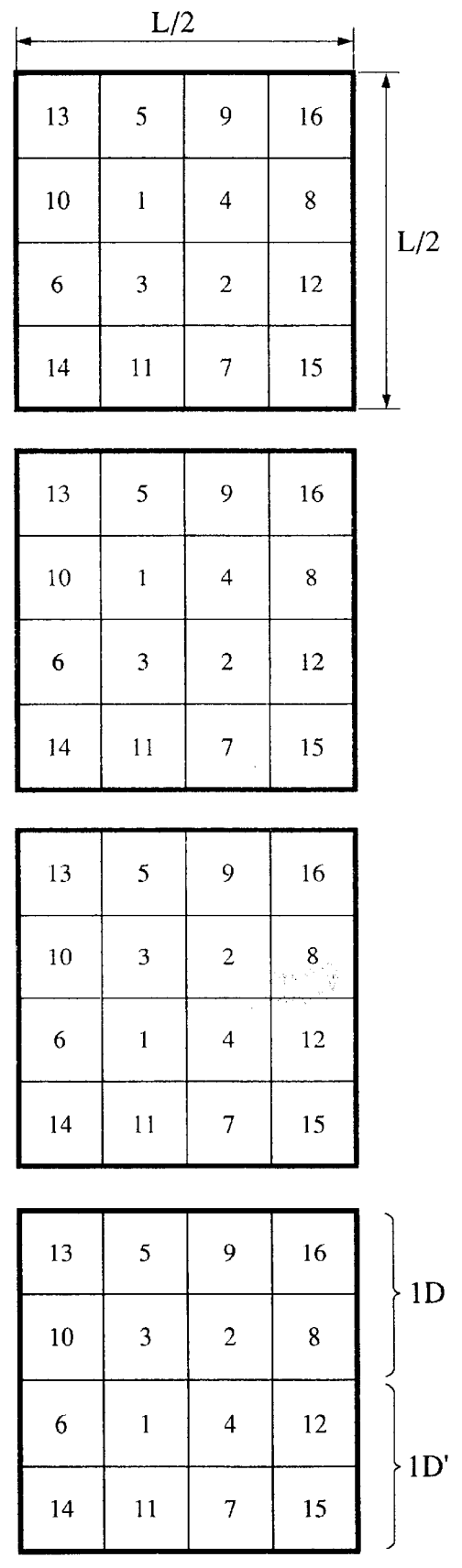

| | L/2 | | |
|---|---|---|---|
| 13 | 5 | 9 | 16 |
| 10 | 1 | 4 | 8 |
| 6 | 3 | 2 | 12 |
| 14 | 11 | 7 | 15 |

| 13 | 5 | 9 | 16 |
|---|---|---|---|
| 10 | 1 | 4 | 8 |
| 6 | 3 | 2 | 12 |
| 14 | 11 | 7 | 15 |

FIG. 23C

| 13 | 5 | 9 | 16 |
|---|---|---|---|
| 10 | 3 | 2 | 8 |
| 6 | 1 | 4 | 12 |
| 14 | 11 | 7 | 15 |

FIG. 23D

| 13 | 5 | 9 | 16 |
|---|---|---|---|
| 10 | 3 | 2 | 8 |
| 6 | 1 | 4 | 12 |
| 14 | 11 | 7 | 15 |

| | | | | | | | |
|---|---|---|---|---|---|---|---|
| 37 | 49 | 57 | 41 | 43 | 59 | 51 | 39 |
| 61 | 53 | 33 | 21 | 23 | 35 | 55 | 63 |
| 45 | 29 | 13 | 5 | 9 | 15 | 31 | 47 |
| 25 | 17 | 11 | 1 | 4 | 8 | 19 | 27 |
| 28 | 20 | 7 | 2 | 3 | 12 | 18 | 26 |
| 48 | 32 | 16 | 10 | 6 | 14 | 30 | 46 |
| 64 | 56 | 36 | 24 | 22 | 34 | 54 | 62 |
| 40 | 52 | 60 | 44 | 42 | 58 | 50 | 38 |

GRAY SCALE PATTERN AND RECORDING METHOD AND RECORDING APPARATUS EMPLOYING THE GRAY SCALE PATTERN

BACKGROUND OF THE INVENTION

1. Field of the Invention

Copying machines, information processing apparatuses, such as word processors or computers, and communication apparatuses have been extensively used in recent years. As output devices for forming (recording) images from data output by any of these apparatus, output devices which perform digital image recording employing an ink jet recording head have been available on the market. Further, high-quality or color information apparatuses or communication apparatuses have also been available, and hence there has been an increasing demand for high-quality or color recording devices.

To improve the recording speed, the ink jet recording apparatus employs a recording head (hereinafter referred to as a multihead) in which a plurality of recording elements, ink discharge ports and liquid flow passages are arrayed at a high density. Color ink jet recording apparatuses having a plurality of multiheads for cyan, magenta, yellow and black colors are also known. In various other types of recording apparatuses, such as thermal recording apparatuses employing an ink ribbon or thermosensitive recording apparatuses for performing recording using the thermosensitive paper, a multihead in which a plurality of recording elements are arrayed at a high density is employed to improve the recording speed, as in the case of the ink jet recording apparatus.

Ink jet recording apparatuses are classified into those which employ electrothermal transducers and those which employ electromechanical transducers, such as piezoelectric elements. In the former type, a heating element (an electrothermal transducer) is provided near a discharge port. Ink is heated locally and changes in the pressure of the ink are generated by application of an electrical signal to that heating element, resulting in discharge of the ink from the discharge port. Ink jet recording apparatuses of the type which employ, as means for discharging ink, electricity-pressure transducers for applying a mechanical pressure to the ink to discharge it, such as piezo elements, are also known.

As the method of performing recording control required for displaying gray scale images in the above-described types of ink jet recording methods, there are the dot density control method in which a number of recording dots having a fixed size per unit area is controlled, and the clot size control method in which the size of a recording dot is controlled. The latter dot size control method requires complicated control to finely change the size of a recording dot, and the region in which the recording dot size can be controlled is limited. Thus, the dot density control method in which recording of gray scale images is performed by controlling the number of recording dots per unit area is normally adopted.

There are two typical binarization techniques required for displaying gray scale images in the above-described dot density control method, ordered dither method and conditionally determined dither method.

The ordered dither method employs, as a dither matrix, a matrix in which thresholds having no relation to input pixels are distributed orderly. The input image is binarized on the basis of the pixel position and the thresholds on the dither matrix by repeating the dither matrix in the horizontal and vertical directions. Accordingly, in this method, the number of gray levels is limited by the matrix size. That is, to increase the number of gray levels, the matrix size must be increased. However, an increase in the matrix size increases the size of a single pixel of a recorded image constituted by a single matrix, thus deteriorating resolution of the recorded image.

The conditionally determined dither method, such as the error diffusion method, is a method in which the value of an input pixel or the threshold is varied with the pixels surrounding the input pixel taken into consideration. The conditionally determined dither method has advantages in that it exhibits excellent compatibility between the gray scale and resolution and in that generation of a moire pattern in a recorded image obtained when the original image is a printed image is very low. However, a bright portion of the image readily becomes irregular, deteriorating the image quality.

In the above-described binarization methods, there is a difference in the image quality. The processing speed also differs between the above two binarization methods. Whereas each pixel is independently processed in the ordered dither method on the basis of the relation between the value of the input pixel and the threshold, not only the relation between the input pixel and the threshold but also the values surrounding the objective pixel must be referred to in the conditionally determined dither method because the input pixel or the threshold is determined by the values surrounding the objective pixel. Thus, the processing speed of the binarization technique in the ordered dither method is higher than that in the conditionally determined dither method.

Regarding the image quality and processing speed, printers in which a printer driver is designed to select either of the two binarization methods depending on an output image or usage of the image are known.

2. Description of the Related Art

The regulated array of thresholds (hereinafter referred to as a gray scale pattern) of the generally employed ordered dither method falls into dot dispersion type and dot concentration type. FIG. 2A illustrates a typical dot dispersion type pattern which represents 64 gray levels and FIG. 2B illustrates a typical dot concentration type pattern which represents 64 gray levels. With these patterns, recording is performed on the dots having up to a number corresponding to the gray level value indicated by an image.

FIG. 2A illustrates a dot dispersion type pattern called Bayer type. With the dot dispersion type gray scale pattern shown in FIG. 2A, recording of dots can be conducted over an entire area of the unit area. In the ink jet recording apparatus, since the ink spreads on the recording medium, making the actually recorded dots wider than desired recording dots, the dot dispersion type gray scale pattern offers the gray scale characteristics shown in FIG. 3A. Consequently, in a high density portion of an image in which many dots are recorded, gray levels do not linearly respond to the numbers of recorded dots, making gray scale display difficult. The above-described gray scale characteristics can be corrected such that a gray level responds almost linearly to the density of an image. However, this creases a pattern which is used over several gray levels or a pattern which is not used at all. In the ordered dither method, since the number of gray levels is determined by the matrix size, the above gray level correction further reduces the number of gray levels, making continuous gray scale display difficult.

FIG. 2B illustrates a dot concentration type gray scale pattern called Fatting type pattern. With the dot concentration type gray scale pattern shown in FIG. 2B, the number of recorded dots increases gradually starting from almost the center of the matrix. Therefore, the amount of dots to be recorded almost linearly corresponds to the proportion of the actually recorded area of the dots relative to the entire area. The gray scale pattern shown in FIG. 2B has gray scale characteristics shown in FIG. 3B due to the relation between the amount of dots recorded in the gray scale pattern area and the proportion of the dot recorded area. Thus, continuity of the gray scale is higher than that of the dot dispersion type. However, since the recorded dots concentrate on almost the center of the matrix, non-recorded areas are generated, making it impossible for the printer to exhibit its own resolution.

Where the number of nozzles of a multinozzle is a multiple of the vertical length of the gray scale pattern, the frequency with which each nozzle is used greatly differs for every nozzle particularly with the dot concentration type gray scale pattern. Accordingly, the often used nozzles deteriorate, and wettability between the nozzle constituting material and the ink changes, making the amount of or direction of ink discharged different for every nozzle. Consequently, the regular array of dots in the ordered dither method becomes irregular. This irregularity of the dot array makes images irregular and reduces the lifetime of the head.

SUMMARY OF THE INVENTION

In view of the aforementioned problems of the prior art, a primary object of the present invention is to provide a gray scale pattern which enables irregularities on an image, caused by differences between the frequencies with which the individual nozzles are used, to be reduced and which enables the lifetime of a recording head to be increased, as well as an ink jet recording apparatus which is capable of recording with such a gray scale pattern.

Another object of the present invention is to provide a gray scale pattern which enables gray scale characteristics to be improved and which enables irregularities on an image, caused by misregistration, to be reduced, as well as an ink jet recording apparatus which is capable of recording with such a gray scale pattern.

To achieve the above-described objects, the present invention provides a recording apparatus which comprises a recording head having an array of a plurality of recording elements for performing recording on a recording medium, and gray scale control means for performing multilevel recording by controlling, according to a predetermined gray scale pattern, a number of dots to be recorded in a single pixel formed of a plurality of recording dots formed by the recording elements of the recording head.

The predetermined gray scale pattern includes a plurality of blocks each having an area smaller than an area of the single pixel and in which dots to be recorded in the block increase starting from almost a center thereof as the number of dots recorded in the single pixel increases, and is designed such that as the number of dots recorded in the single pixel increases, the number of dots to be recorded in the block increases by a predetermined amount in a predetermined order of the plurality of blocks.

The present invention further provides a gray scale pattern for use in multilevel recording performed by a recording apparatus including a recording head having an array of a plurality of recording elements for performing recording on a recording medium, and gray scale control means for performing multilevel recording by controlling a number of dots to be recorded in a single pixel formed of a plurality of recording dots formed by the recording elements of the recording head. The gray scale pattern includes a plurality of blocks each having an area smaller than an area of the single pixel and in which dots to be recorded in the block increase starting from almost a center thereof as the number of dots recorded in the single pixel increases. As the number of dots recorded in the single pixel increases, the number of dots to be recorded in the block increases by a predetermined amount in a predetermined order of the plurality of blocks.

The present invention further provides a recording apparatus for performing recording by a recording head having a plurality of recording elements, which comprises gray scale means for performing multilevel recording by a number of recording dots in a single pixel formed of a plurality of dots formed by the recording elements of the recording head, and a gray scale pattern set according to each of gray levels in the single pixel. The maximum difference between numbers of times the individual recording elements are used in a range defined by the gray scale pattern is not more than twice.

The present invention is designed to make uniform the frequencies with which individual recording elements of a multihead are used in a recording apparatus for performing gray scale recording by controlling a number of dots recorded in a unit area. The gray scale pattern used to display gray scale is a pattern in which a plurality of blocks each comprising a dot concentration type gray scale pattern having a size smaller than that of the gray scale pattern is dispersed. The maximum difference between numbers of times the recording elements in the range of the gray scale pattern are used can be restricted within twice, and individual nozzles can be used uniformly.

Consequently, imbalance of changes in the recording elements with time, caused by the differences between the frequencies with which the recording elements are used, can be restricted, thus restricting irregularities in an image.

BRIEF DESCRIPTION OF THE DRAWINGS

FIG. 2A illustrates a typical dot dispersion type gray scale pattern;

FIG. 2B illustrates a typical dot concentration type gray scale pattern;

FIG. 4 illustrates a printed state obtained when the gray scale pattern is synchronized with nozzles;

FIG. 8 illustrates a dot concentration type gray scale pattern which satisfies the limitations of the present invention;

FIG. 10 illustrates a dot concentration type gray scale pattern which satisfies the limitations of the present invention;

FIG. 11 illustrates a thinning mask pattern;

FIGS. 14 and 15 are respectively lists which show the frequencies with which nozzles are used;

FIGS. 18A through 18C and 19A through 19C illustrate examples of printing performed with a multihead;

FIGS. 20A through 20C and 21A through 21C illustrate multipass printing;

FIGS. 22A, 22B, 23A through 23D and 24 illustrate the gray scale pattern shown in FIG. 1;

FIGS. 25 and 26 illustrate the gray scale pattern shown in FIG. 8;

DETAILED DESCRIPTION OF THE PREFERRED EMBODIMENTS

Embodiments of the present invention will be described below with reference to the accompanying drawings.

Copying machines, information processing apparatuses, such as word processors, computers and communication apparatuses have been extensively used. As devices for forming (recording) images for any of these apparatuses, devices which perform digital image recording employing an ink jet recording head have been available on the market. Further, inexpensive or color information apparatuses or communication apparatuses have also been available, and hence there has been an increasing demand for color recording devices or recording devices capable of performing printing on the plain paper. To improve recording speed in the ink jet recording apparatuses, a recording head (hereinafter referred to as a multihead) in which a plurality of recording elements, ink discharge ports and liquid flow passages are arrayed at a high density is used. Color ink jet recording apparatuses having a plurality of multiheads corresponding to the recording colors are also known.

Figure 16:
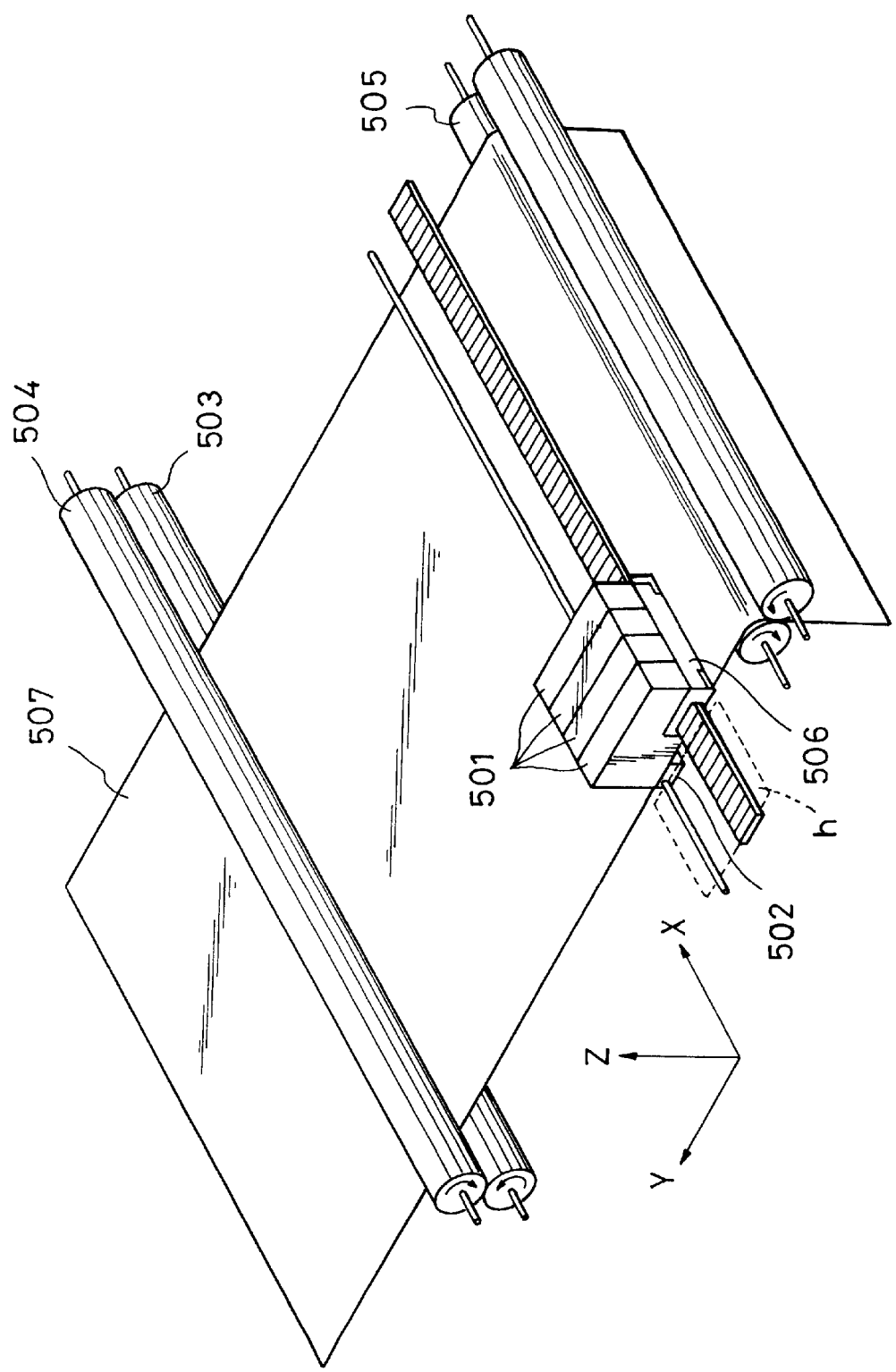
FIG. 16 is a perspective view of a recording portion of an ink jet printer which can be employed in the present invention.
Figure 17:
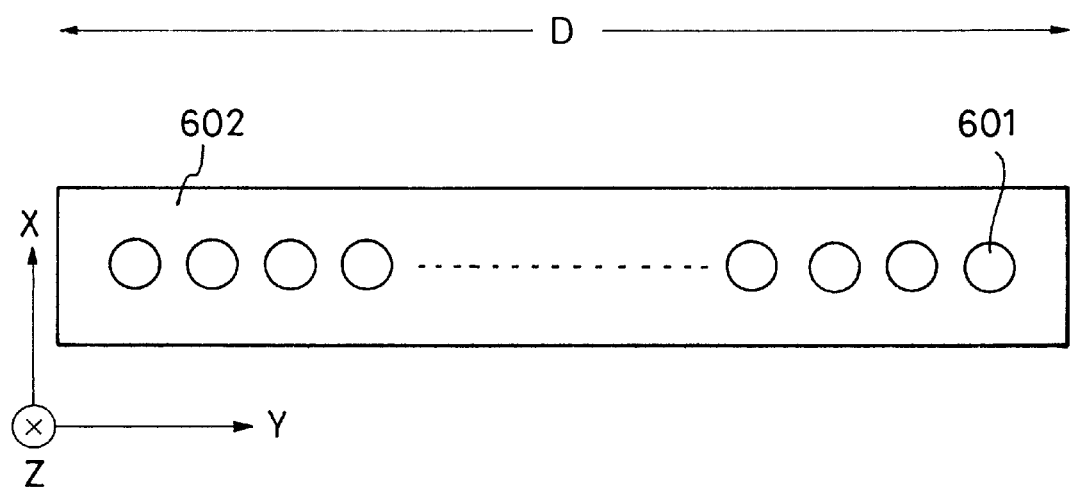
FIG. 17 illustrates a multihead.

FIG. 16 illustrates the major portion of a serial printer for performing printing on a recording medium by operating a multihead relative to the recording medium. In FIG. 16, reference numerals 501 denote ink cartridges. The ink cartridges 501 include ink tanks which respectively accommodate inks of four colors (black, cyan, magenta and yellow), and a multihead 502. FIG. 17 illustrates multinozzles arrayed on the multihead 502 shown in FIG. 16, as viewed when looking from a direction indicated by the arrow z shown in FIG. 16. In FIG. 17, reference numerals 601 denote multinozzles arrayed on the multihead 502.

In FIG. 16, reference numeral 503 denotes a paper feed roller which rotates in the direction indicated by the arrow while pressing the printing paper together with an auxiliary roller 504 to convey a sheet of printing paper 507 in a direction indicated by the arrow y. Reference numeral 505 denotes a paper supply roller which supplies the printing paper. The paper supply roller 505 also presses the printing paper 507, like the rollers 503 and 504. Reference numeral 506 denotes a carriage which supports the four ink cartridges and moves these ink cartridges during printing. The carriage 506 retreats to a home position (h) indicated by the broken line in FIG. 16 and waits when no printing is conducted or when recovery operation of the multihead is conducted.

Before printing is started, the carriage 506 is at the indicated position (home position). When a printing starting command arrives, the carriage 506 starts moving in the direction indicated by the arrow x during which time it performs printing on the paper over a region corresponding to a width D with the multinozzles 601. When data printing up to the end portion of the paper is completed, the carriage returns to the home position, and then performs scanning in the x direction and printing again. Between completion of printing of the first line and starting of printing of the second line, the paper is fed in the y direction by width D by rotating the paper feed roller 503 in the direction indicated by the arrow. Data printing on the paper sheet is thus performed by repeating printing over the width D of the multihead and paper feed for each scanning operation of the carriage.

(First Embodiment)

Figure 1A:
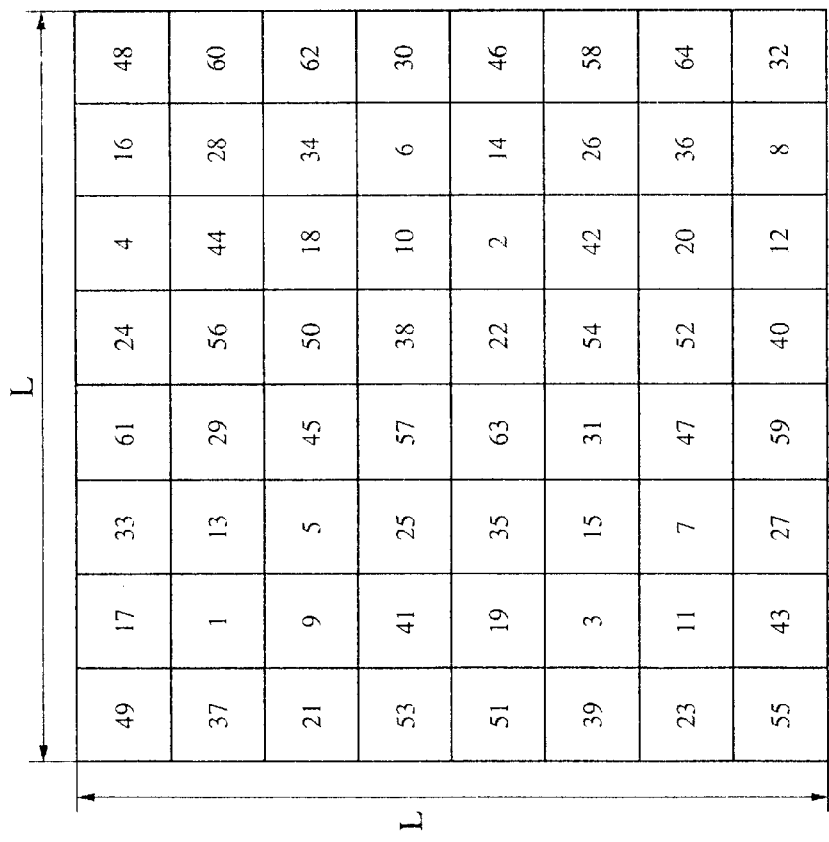
FIGS. 1A and 1B illustrates a gray scale pattern which satisfies the limitations of the present invention and gray scale characteristics thereof.
Figure 1B:
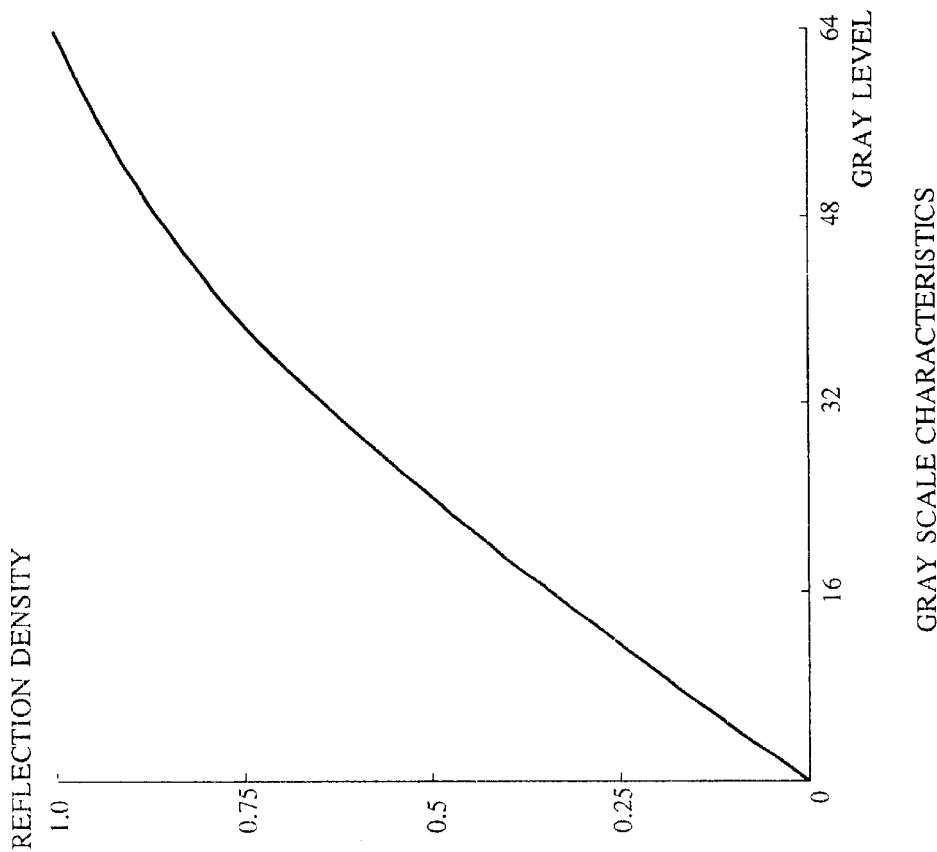
Figure 3A:
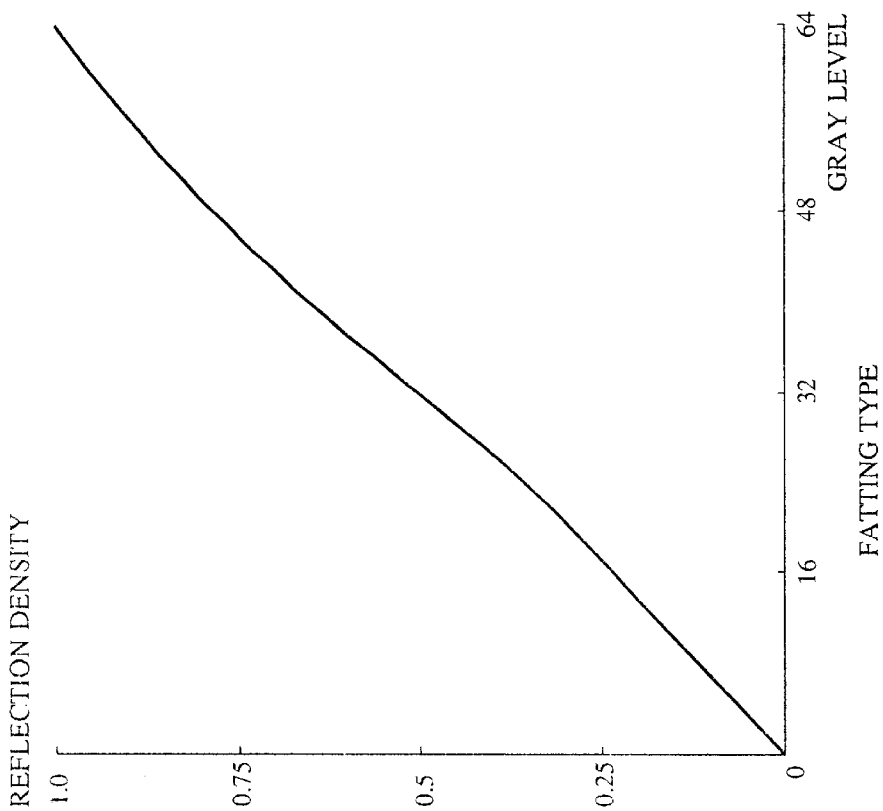
FIGS. 3A and 3B illustrate gray scale characteristics obtained in recording performed with typical gray scale patterns using an ink jet recording apparatus.
Figure 3B:
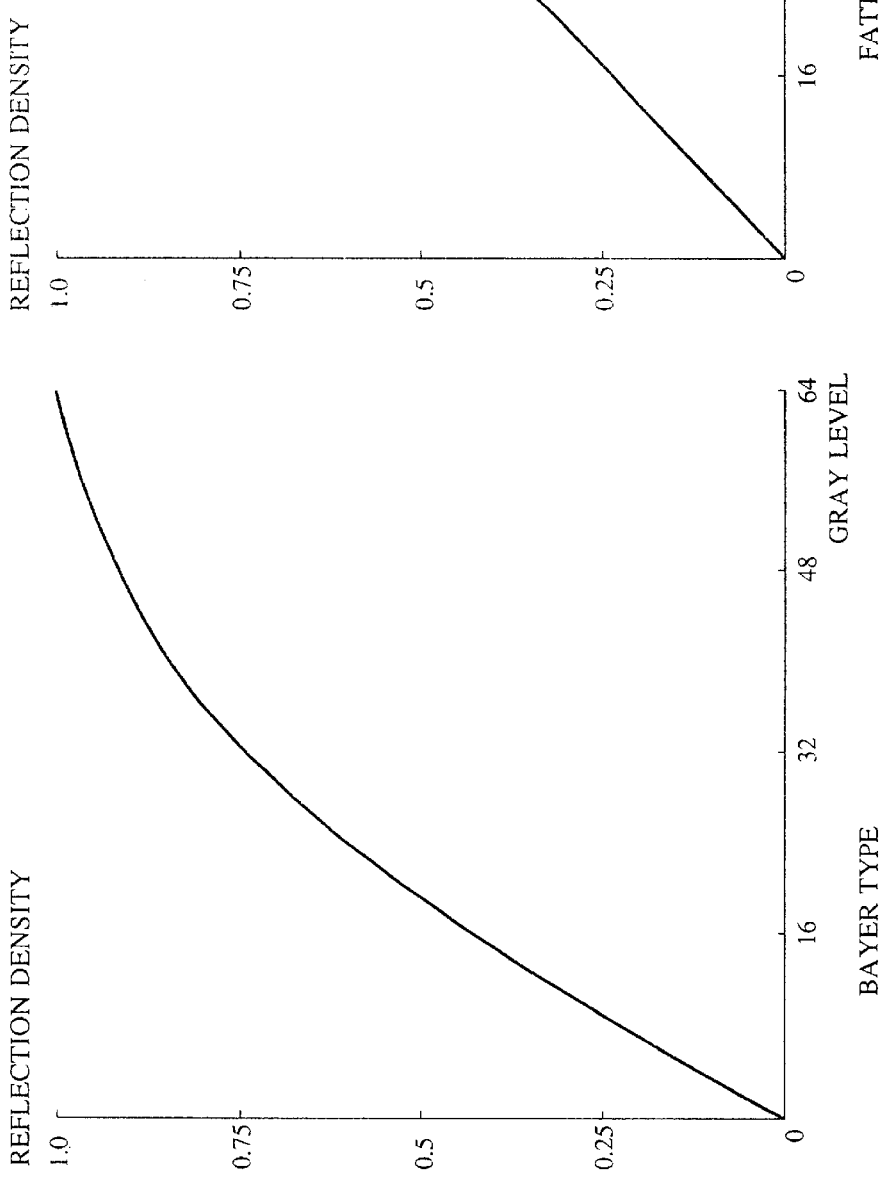

FIG. 1 illustrates an example of a gray scale pattern which enables reduction in the irregularities on an image, caused by differences between the frequencies with which the nozzles are used in the first embodiment of the present invention. The pattern shown in FIG. 1 forms a single pixel whose gray level is displayed by 8×8 dots. In FIG. 11, L means the vertical and horizontal length of the single pixel.

FIG. 4 illustrates the process of forming dots on the paper when recording having a duty of 50% is performed with the Fatting type gray scale pattern having a size of 8×8, shown in FIG. 2B, using the head having 16 multinozzles. In this case, since the number of multinozzles is twice that of the vertical dimension of the gray scale pattern, the fourth nozzle always prints the binary data obtained with the fourth line of the gray scale pattern. Similarly, the ninth nozzle always prints the binary data obtained with the first line of the gray scale pattern. That is, when the number of multinozzles is n times (n is an integer) the vertical dimension of the gray scale pattern, since the gray scale pattern is synchronized with the nozzles, the n×ith nozzle of the multinozzles always prints the binary data obtained with the ith line of the gray scale pattern, as shown in FIG. 4. In the example shown in FIG. 4, the fourth nozzle of the multihead 502 prints 6 dots in the region (a pixel region recorded by 64 dots of 8×8) determined by the gray scale pattern of FIG. 2B while the ninth nozzle prints no dot.

FIG. 14 shows the number of dots in the gray scale pattern which is recorded at each of the gray levels with the dot concentration type gray scale pattern shown in FIG. 2B. In the case of the dot concentration type gray scale pattern shown in FIG. 2B, if it is assumed that all the gray levels (64 gray levels in the size of 8×8) are used at the same frequency, the frequency at which the most frequently used nozzle is used is about 3.5 times the frequency at which the least frequently used nozzle is used, as shown in FIG. 14.

FIG. 15 shows the number of dots in the gray scale pattern which is recorded at each of the gray levels with the gray scale pattern according to the present invention shown in FIG. 1. According to FIG. 15, it is clear that the frequency with which the most frequently used nozzle is used is about 1.1 times the frequency at which the least frequently used nozzle is used where the gray scale pattern shown in FIG. 1 is used. Although variations in the amount of ink discharged from a nozzle caused by changes of the nozzle with time differ depending on the structure of the recording head or the composition of the ink, they tend to either increase due to aging or decrease due to degradation of the discharge heater, such as burning, if the individual nozzles have almost the same diameter. Thus, when the gray scale pattern shown in FIG. 2B is used, differences in the amount of ink discharged between the individual nozzles, caused by changes of the nozzles with time, increase from those obtained at an initial stage, thus increasing irregularities of the images. With the gray scale pattern according to the present invention, shown in FIG. 1, since the frequencies with which the individual nozzles are used can be made almost uniform and differences in the amount of ink discharged between the nozzles therefore remain substantially the same, generation of the irregularities on the image, caused by differences in the amount of ink discharged from the nozzle between the individual nozzles, remains almost the same.

Next, lifetime of the nozzle will be considered. Assuming that the lifetime of the individual nozzle assures ink discharge from that nozzle A times, since the lifetime of the recording head is determined by the first nozzle to break, if the individual nozzles are used at almost the same frequency, the lifetime of the recording head is 100% of the lifetime of the nozzle. However, when the pattern shown in FIG. 2B is used, since the most frequently used nozzle is used at a time which is about 147% of the time with which that nozzle is used when the individual nozzles are used almost the same time, the Lifetime of the recording head reduces to about 68%. In the case of the gray scale pattern shown in FIG. 1, since the individual nozzles are used at almost the same time and the most frequently used nozzle is thus used at a time which is about 106% of the time with which that nozzle is used when the individual nozzles are used at almost the same time, the lifetime of the recording head is reduced to about 94%. Thus, the lifetime of the recording head is increased as compared with the lifetime obtained when the dot concentration type gray scale pattern shown in FIG. 2B is used.

Figure 22B:
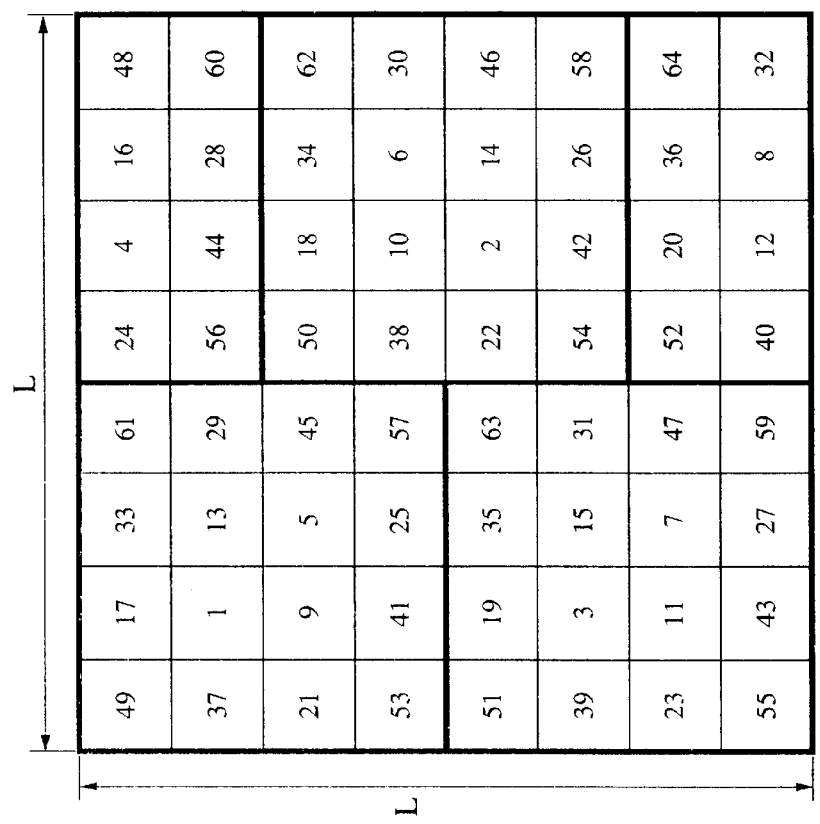
Figure 22A:
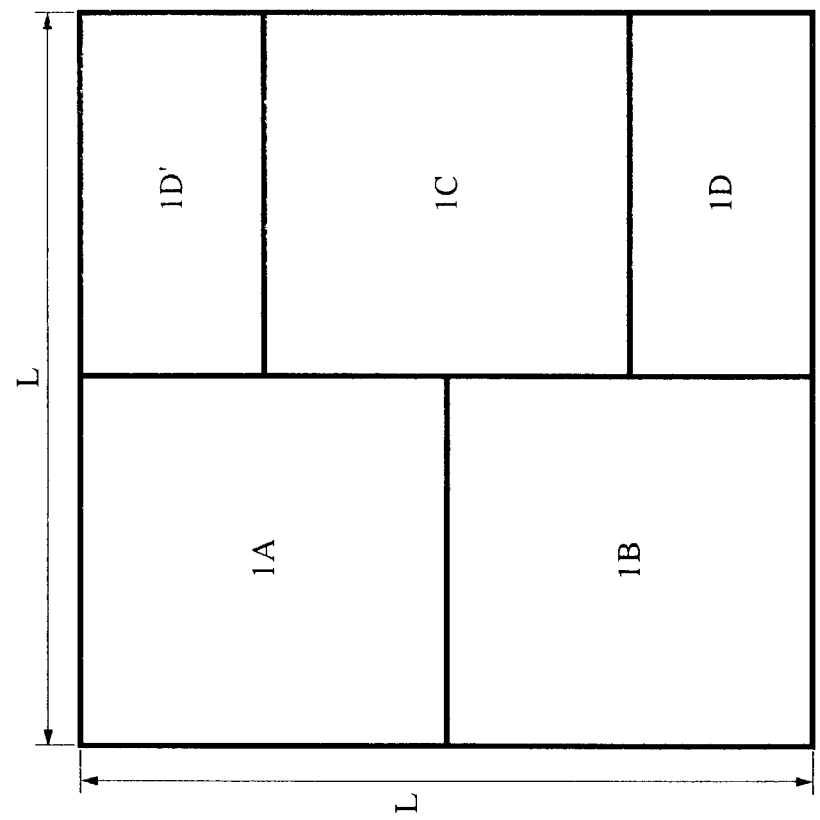

The gray scale pattern shown in FIG. 1 is composed of blocks 1A, 1B, 1C, 1D and 1D' (hereinafter referred to as block pixels), as shown in FIG. 22A. The blocks 1D and 1D' form a block similar to any of the other blocks 1A, 1B and 1C by connecting the lower portion of the block 1D to the upper portion of the block 1D'. That is, the gray scale pattern shown in FIG. 1 is composed of four blocks.

Each of the blocks constitutes a dot concentration type gray scale pattern which can display 16 gray levels. A single gray scale pattern which can display 64 gray levels is formed by combining the four blocks with each other.

FIG. 22B shows the positional relation between the thresholds and the blocks in the gray scale pattern shown in FIG. 1A. It is clear from FIG. 22B that dots are recorded in the blocks sequentially in the order of 1A, 1C, 1B and 1D as the value of the input pixel data increases.

FIGS. 23A, 23B, 23C and 23D illustrate the arrays of the thresholds in the blocks 1A, 1B, 1C and 1D shown in FIG. 22, respectively. The array shown in FIG. 23D is a state in which the blocks 1D and 1D' shown in FIG. 22A are connected to each other. As mentioned above, blocks 1A, 1B, 1C and 1D are each dot concentration type gray scale patterns capable of displaying 16 gray levels. As the value of the input pixel data increases, the number of recorded dots in each of the blocks increases in the order of 1A, 1C, 1B and 1D.

Turning again to FIG. 23, the array of four dots which are displayed first in each of the blocks differs between blocks 1A and 1B and blocks 1C and 1D. As can be seen from FIG. 22, the position of blocks 1A and 1B deviates from that of blocks 1C and 1D in the vertical direction by L/2. When the array of first recorded four dots is different in each of the blocks, irregularities in the recording density in the gray scale pattern shown in FIG. 1A can be lessened by virtue of the position of the center of the block.

Figure 24:
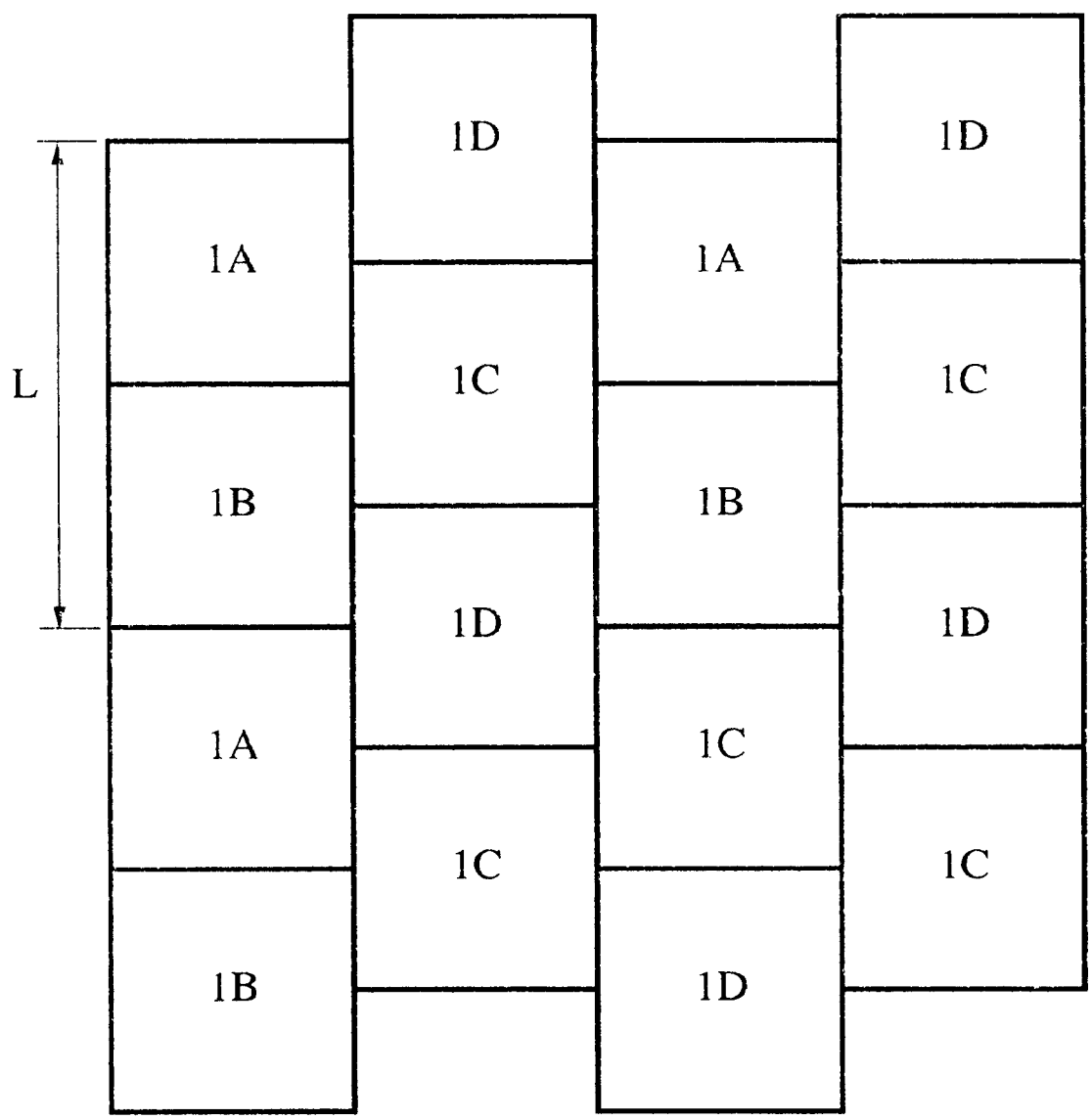

FIG. 24 schematically illustrates the positional relationship between the individual blocks in the results obtained when recording is performed with the gray scale pattern shown in FIG. 1. As can be seen from FIG. 24, blocks 1D and 1D' located below and above block 1C in FIG. 22 are located adjacent to each other in the recording results to form a single block. In order to average the frequencies with which the individual recording elements of the multihead are used, the individual blocks may have the same pattern.

More specifically, the gray scale pattern shown in FIG. 1 is a dot dispersion type gray scale pattern constituted by a plurality of blocks each constituting a dot concentration type gray scale pattern.

According to the gray scale pattern shown in FIG. 1, the positions where the dots concentrate in the respective block gray scale patterns shown in FIG. 22 are dispersed in the direction in which the multinozzles 602 shown in FIG. 17 are arrayed. Thus, the frequencies with which the multinozzles 602 are used can be made uniform, and continuity of the gray scale can be enhanced.

As will be understood from the foregoing description, in this embodiment, the maximum difference between the numbers of times the nozzles are used within the range determined by the gray scale pattern is not more than twice, and the nozzle within the range determined by the gray scale pattern is used n times only when 50% of all the nozzles in the gray scale pattern are used n−1 times. Thus, irregularities of the image caused by differences between the frequencies with which the nozzles are used are lessened, and the lifetime of the recording head can be increased.

(Second Embodiment)

A second embodiment of the present invention will be described below.

The printing method employed in this embodiment is the divided printing method (multipass printing) shown in FIGS. 18 through 21. Multipass printing is a printing method in which the image data to be printed within the unit area is printed in that area as two divided portions. This recording method is effective to reduce blurring which would occur on the boundary between different colors in the recording conducted on the plain paper and irregularities in the density in a head, caused by variations in the individual multinozzles.

Figure 18C:
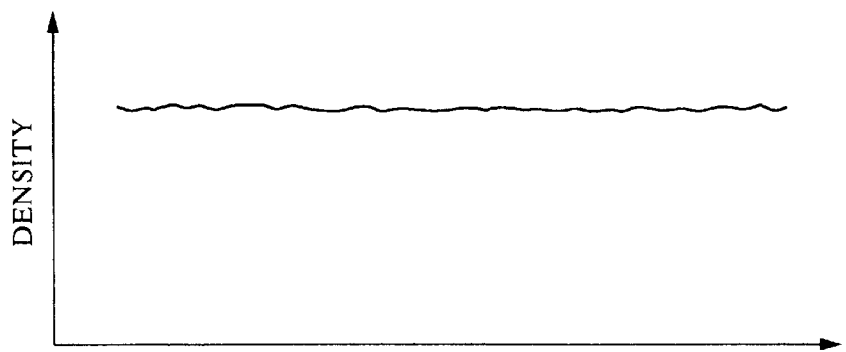
Figure 18B:
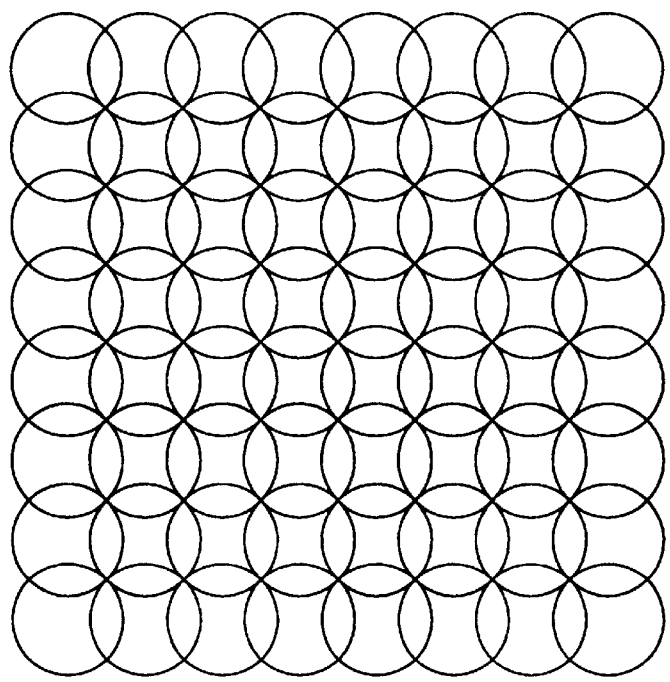
Figure 18A:
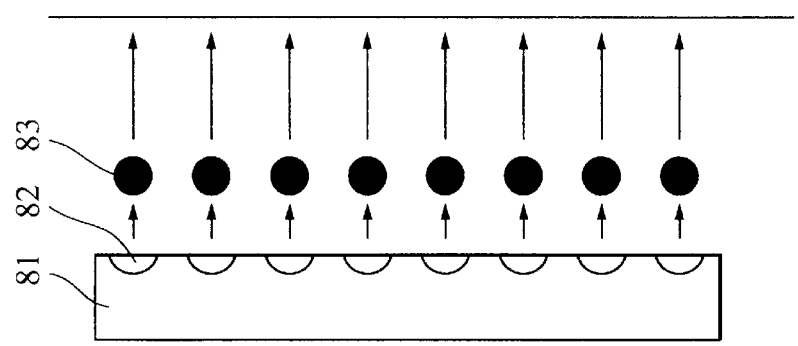

In FIG. 18A, reference numeral 81 denotes a multihead having the same configuration as that of the multihead shown in FIG. 17. However, it is assumed that the multinozzles shown in FIG. 18A are 8 nozzles to simplify the explanation. Reference numerals 83 denote ink droplets discharged by the multinozzles 82. A head is manufactured such that it normally discharges ink droplets having a uniform amount in a uniform direction, as shown in FIG. 18A. Where ink discharge is performed in an adequate amount in an adequate direction, dots having a uniform size land on the paper, as shown in FIG. 18B, enabling an image having no irregularities in density to be obtained (FIG. 18C).

However, as mentioned above, the actually employed nozzles have variations due to the manufacturing process or changes with time. Therefore, if printing is performed in the same manner as the above-described manner, the ink droplets discharged from the individual nozzles have different sizes and directions, as shown in FIG. 19A, and land on the paper in the manner shown in FIG. 19B. In the example shown in FIG. 19B, a blank portion exists periodically or dots overlap on top of the other too much in the horizontal direction of the head. Alternatively, a white stripe such as that shown at the center may be generated. The set of dots which have landed in such a manner shows a density distribution shown in FIG. 19C in the direction in which the nozzles are arrayed. These phenomena are recognized as irregularities in the density in an image.

Figure 21A:
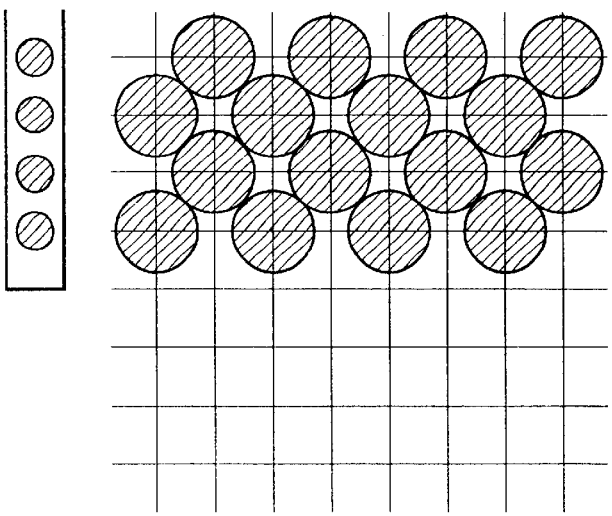
Figure 21B:
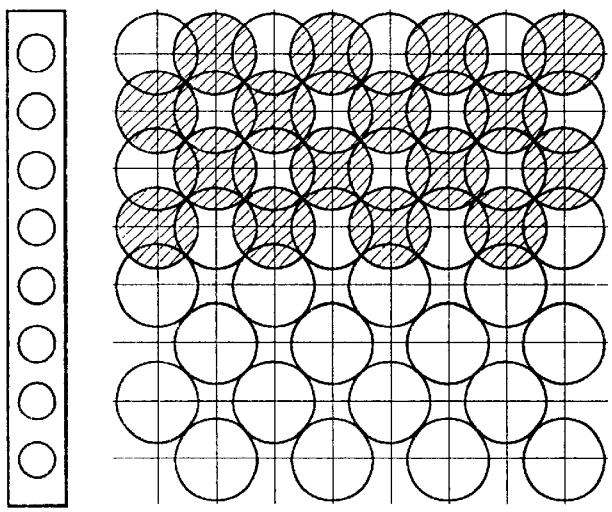
Figure 21C:
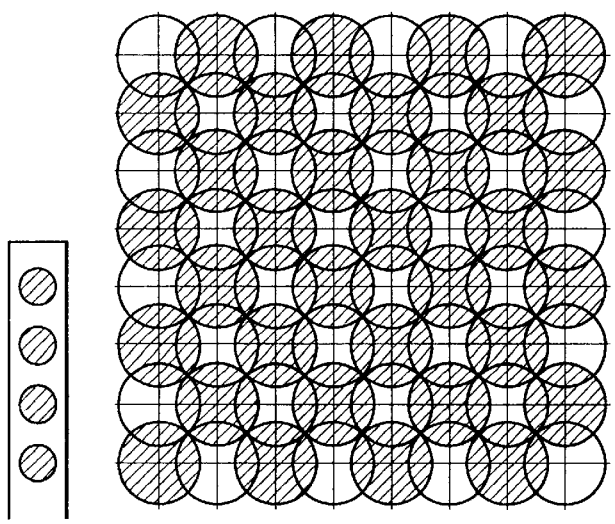

Hence, it has been proposed to perform printing in the manner shown in FIGS. 20 and 21 to prevent irregularities in the density caused by variations in the individual nozzles in the head. In the method shown in FIGS. 20 and 21, the head 81 is scanned three times in total to complete the printing area shown in FIGS. 18 and 19 in which half the unit area of the four pixels is completed by two passes. In that case, 8 nozzles of the multihead are grouped into upper four nozzles and lower four nozzles. The dots printed by the single nozzle in the first scanning are those obtained by thinning predetermined image data to about half according to a predetermined image data array (a checkerboard pattern shown in FIG. 21). In the second scanning, dots are recorded in the remaining half of the image data (an inverted checkerboard pattern shown in FIG. 21) to compensate for the previously recorded image, thereby completing printing of the four pixel unit area. Such a recording method is hereinafter referred to as the divided recording method (multipass printing).

In this embodiment, the aforementioned multipass printing method is employed in the color graphic mode in which recording is conducted using a plurality of color inks. In the above description, the multihead having eight nozzles is used to simplify the explanation. However, a head having other numbers of nozzles can also be employed. In the case of a multinozzle head having, for example, 64 nozzles, 64 nozzles are divided into two groups each having nozzles, and paper feed is performed by a distance corresponding to 32 dots. In each paper feed operation, a printing area of 32 dots is completed. In this way, in the color graphic mode, blurring which would occur on the plain paper between different colors can be prevented, and irregularities in the density in the head, caused by variations in the individual multinozzles, can be lessened, enabling excellent color graphic image to be obtained on the plain paper.

Figure 5:
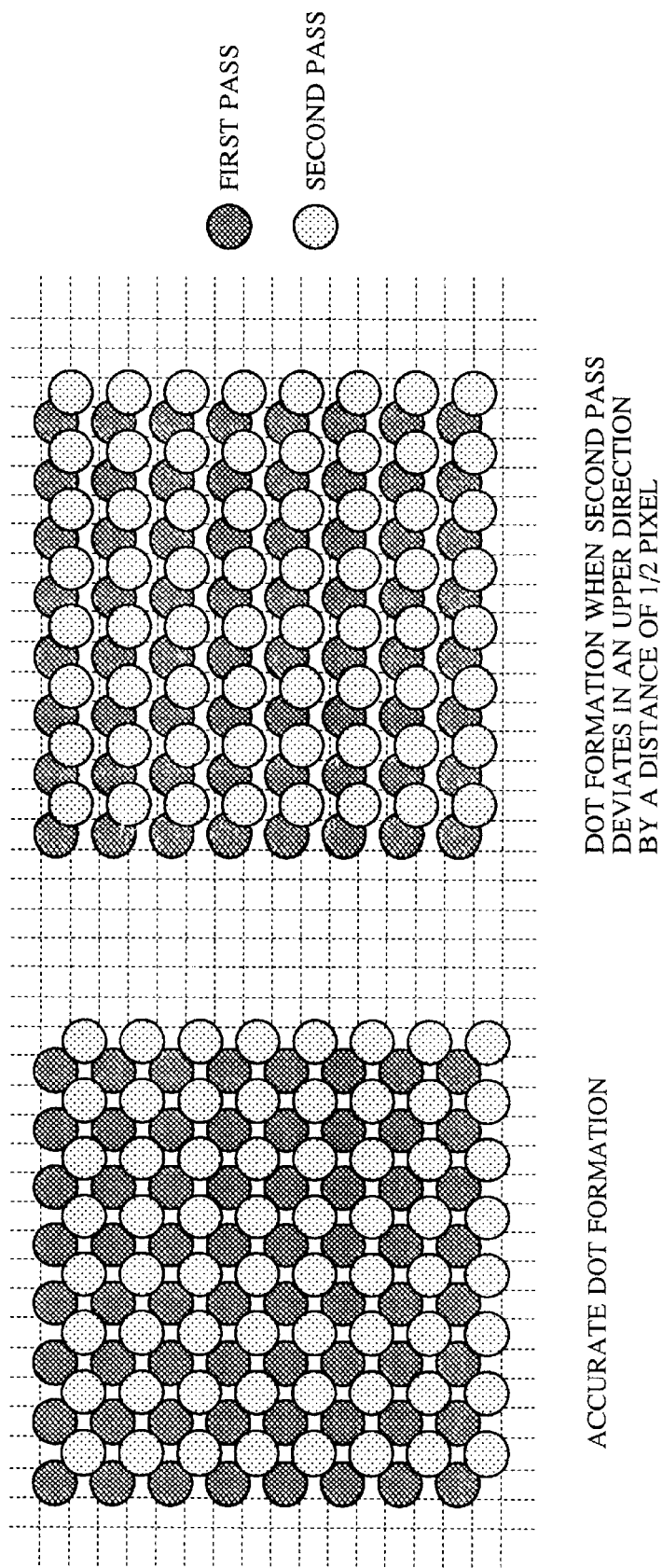
FIG. 5 illustrates an influence caused by deviation of dot landing positions on the dot dispersion type gray scale pattern.
Figure 6:
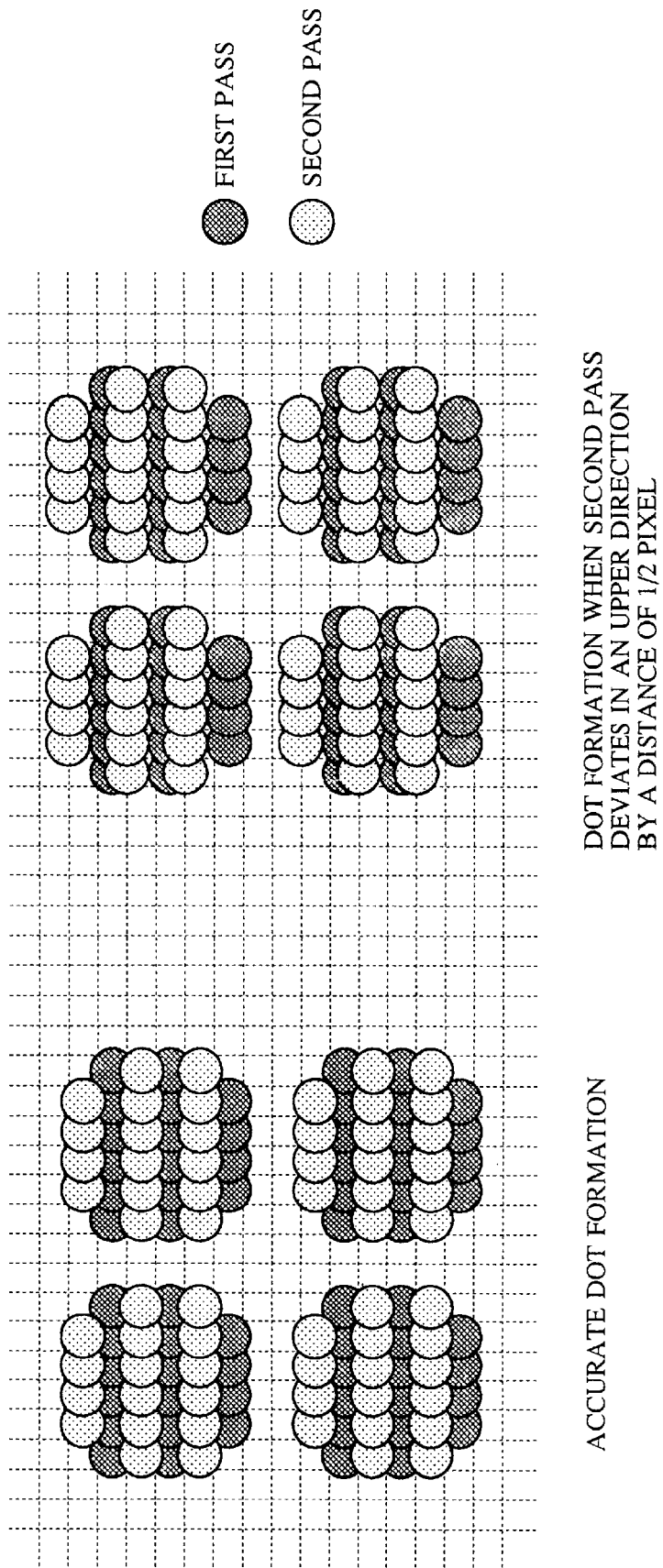
FIG. 6 illustrates an influence caused by deviation of dot landing positions on the dot concentration type gray scale pattern.

In the multipass printing, since a fixed printing area is completed in a plurality of scannings, misregister, caused by mechanical accuracy of the recording apparatus body, would occur. Where an image of 50% duty is recorded with the dot dispersion type gray scale pattern shown in FIG. 2A by printing the odd lines in the first pass and the even lines in the second pass, if the pixel dots are printed at positions which deviate by a ½ line in the direction of paper feed, blank stripes appear in the image, greatly deteriorating the quality of the recorded image as compared with that obtained when accurate dots are formed, as shown in FIG. 5. In contrast, when similar printing is performed with the dot concentration type gray scale pattern shown in FIG. 2B, a cluster of dots representing pixels may be slightly expanded in the vertical direction, as shown in FIG. 6 but a reduction in the image quality, which would occur when dots are not formed accurately, is less than that obtained with the dot dispersion type pattern. This is because in the dot dispersion type gray scale pattern, dots are uniformly dispersed so as to make the resolution of a printer utilized effectively, slight deviation of the dot positions readily leads to irregularities on the image, while in the dot dispersion type gray scale pattern, dots are concentrated at almost the center of the matrix so as to provide a rough pattern which deteriorates virtual resolution of a printer, slight deviation of the dot positions may be absorbed by the roughness of the pattern, making generation of irregularities of the image difficult.

However, as mentioned in the first embodiment, if the dot concentration type gray scale pattern is employed in the ink jet recording apparatus, the recording head may be adversely affected, e.g., irregularities of the image, caused by differences in the frequencies with which the nozzles are used, may be generated or the lifetime of the recording head may be reduced.

Figure 7:
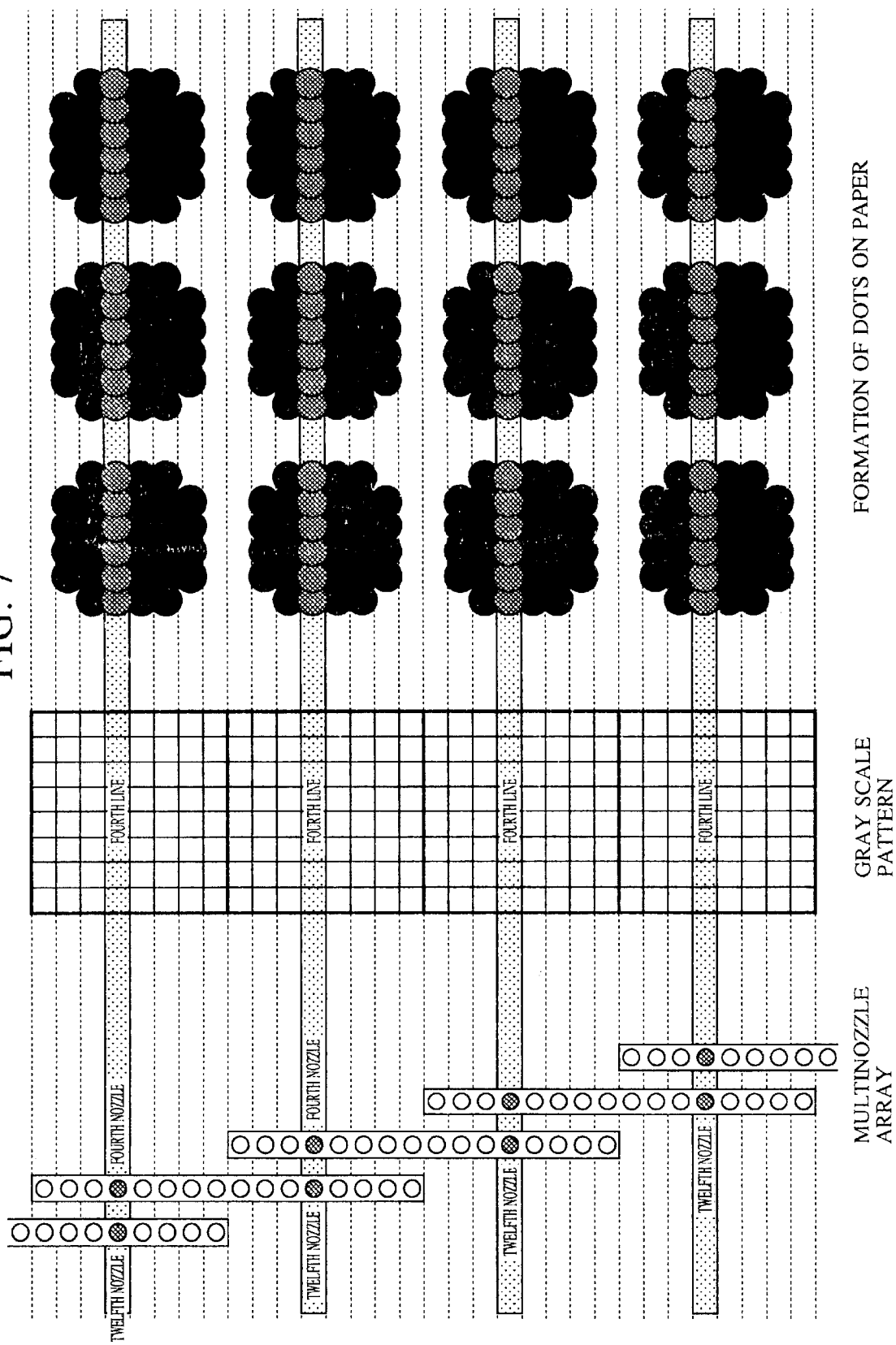
FIG. 7 illustrates a printed state obtained in 2-pass printing.

FIG. 7 illustrates the recording process of the divided recording method when the size of the gray scale pattern is 8×8 and the number of multinozzles is 16. In this recording, data of even lines obtained by thinning data according to a predetermined image data array is recorded by 8 nozzles of the multinozzles located closer to paper discharge, the paper is fed by a distance corresponding to 8 nozzles, and then the data of the remaining odd lines, is recorded at positions where no data is recorded previously. That is, in this embodiment, multipass printing in which an image is completed by the two scanning operations is employed. At that time, since the number of nozzles in the multinozzles is twice the size of the gray scale pattern in the vertical direction, the fourth nozzle always prints the data binarized by the fourth line of the gray scale pattern in the second pass. Similarly, the twelfth nozzle always prints the data binarized by the fourth line of the gray scale pattern in the first pass. However, since printing at the first pass thins out the even lines while printing at the second pass thins out the odd lines, the fourth nozzle prints all the binary data and the twelfth nozzle prints no binary data at all. In that case, since the number of nozzles corresponding to the distance through which the paper is fed is a multiple of the size of the gray scale pattern in the vertical direction, the gray scale pattern is synchronized with the nozzles, as in the case of the first embodiment.

In addition, when the thinning pattern shown in FIG. 7 is used, the number of dots formed by the paper discharge side 8 nozzles may not be balanced with the number of dots formed by the paper supply side 8 nozzles. Therefore, even if the same gray scale pattern as that employed in the first embodiment is employed, the maximum difference between the frequencies with which the nozzles are used further increases.

However, if the gray scale pattern such as that shown in FIG. 8 is used, even though the number of dots formed by the individual nozzles may become unbalanced by the thinning pattern, since the maximum difference between the frequencies with which the nozzles are used is small despite the fact that the gray scale pattern shown in FIG. 8 is a dot concentration type gray scale pattern, an adverse affect of the dot concentration type gray scale pattern is small.

Figure 25:
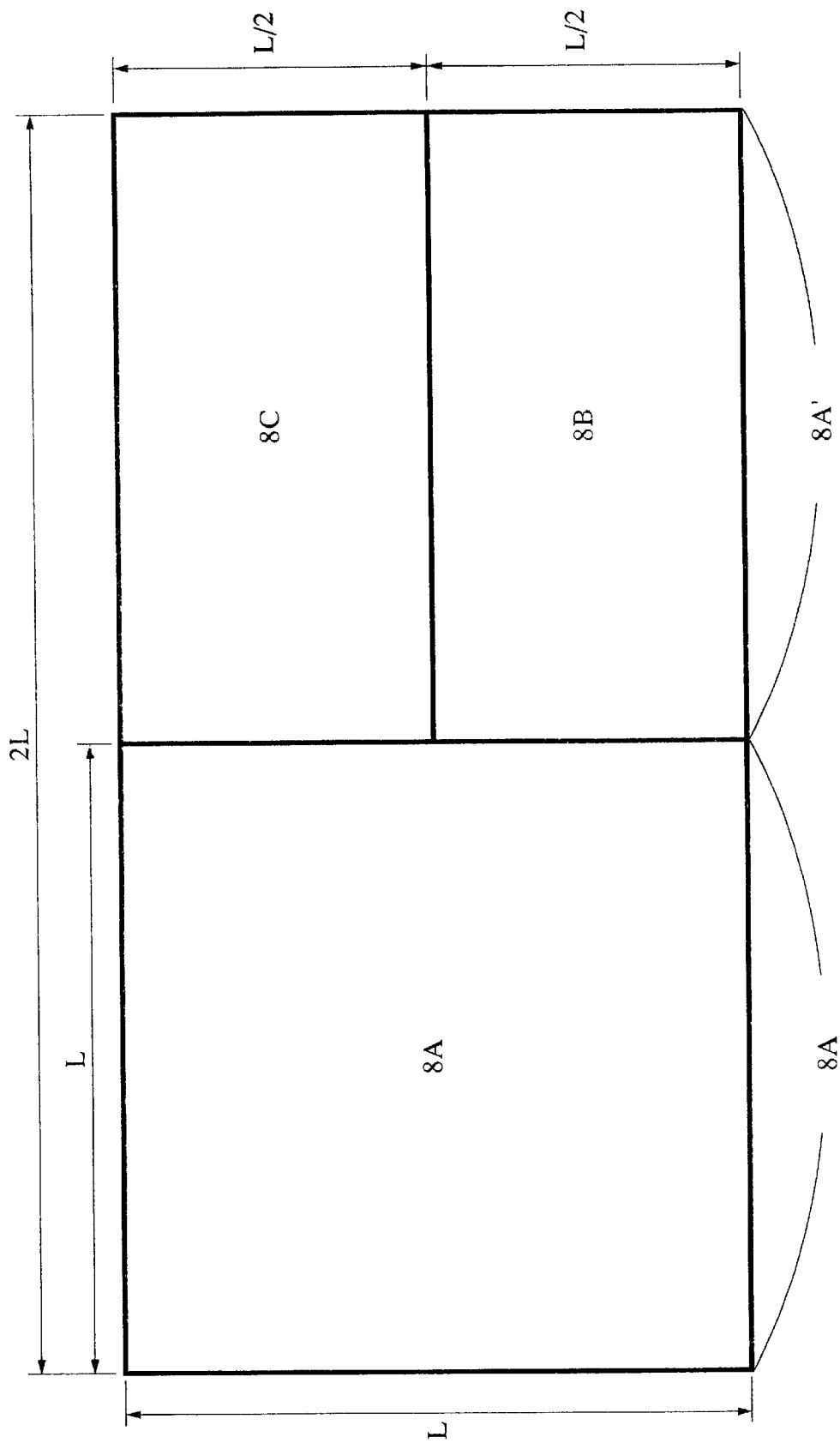

The gray scale pattern shown in FIG. 8 consists of 8×16 dots and displays 128 gray levels. The gray scale pattern shown in FIG. 8 consists of 2 blocks of gray scale patterns 8A and 8A' having 8×8 size, as shown in FIG. 25. The block 8A' is formed by vertically divided blocks 8B and 8C.

Referring to FIGS. 8 and 26, the block 8A' formed of blocks 8B and 8C is obtained by switching upper and lower blocks obtained by dividing block A into upper and lower blocks.

In this way, the positions at which dots are concentrated in the respective block gray scale patterns shown in FIG. 25 are scattered in the direction of array of the multinozzles 602 shown in FIG. 17. As a result, the frequencies with which the multinozzles 602 are used become uniform, and continuity of the gray scale can be enhanced.

Figure 9:
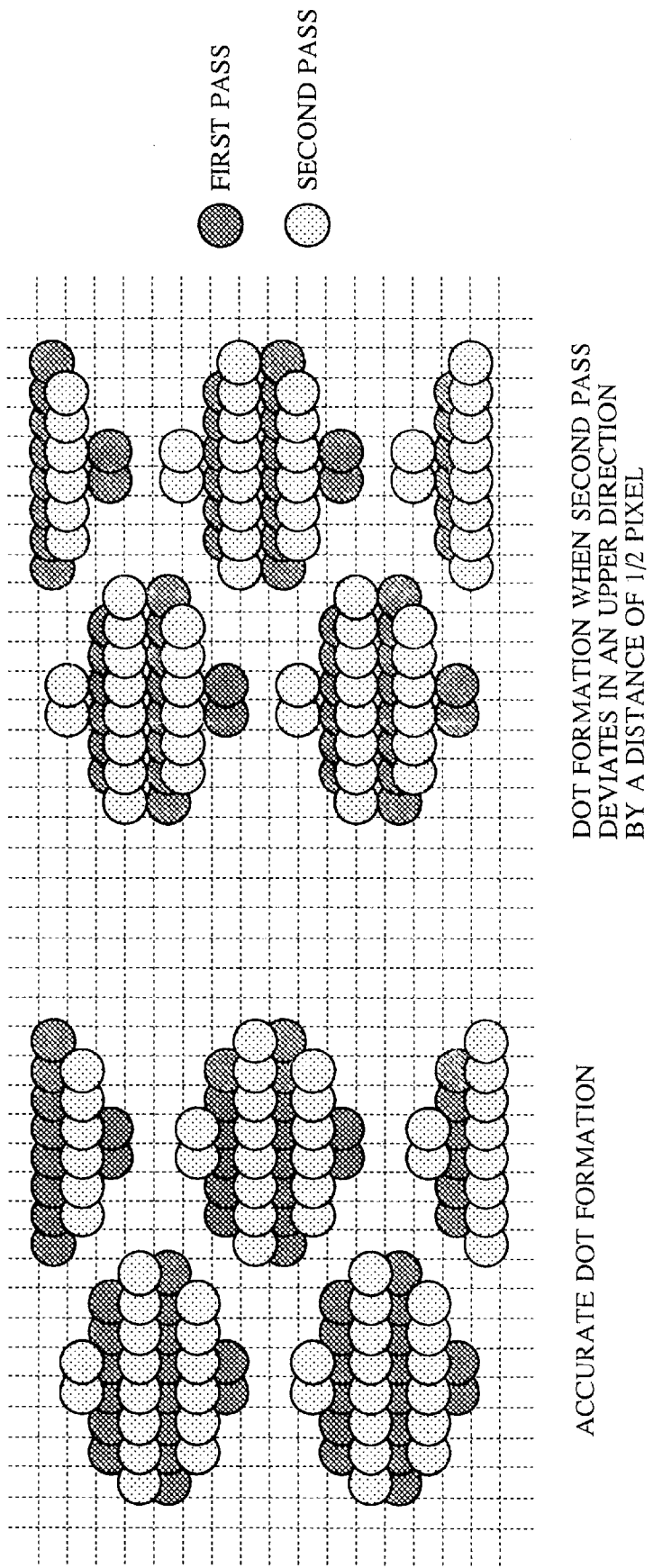
FIG. 9 illustrates an influence of deviation of dot landing positions on the gray scale pattern shown in FIG. 8

Further, if the dots are printed at positions which deviate by ½ pixel in the direction of paper feed, the portion where the dots are concentrated is expanded in the vertical direction, as shown in FIG. 9, because of the dot concentration type gray scale pattern. However, there is not so much adverse influence of deviation on an image. Therefore, in multipass printing, misregistration caused by recording accuracy including mechanical accuracy of the body or variations in the amount of discharged ink caused by differences between the frequencies with which the nozzles are used can be restricted, thus restricting generation of irregularities of the image.

(Third Embodiment)

A third embodiment of the present invention will be described below.

In the serial type recording apparatus shown in FIG. 16, when bidirectional printing, in which recording is performed during reciprocative scanning by reciprocatingly moving the carriage with the recording head mounted, is performed, misregistration may be great because of various reasons including the distance between the paper surface and the face of the head, irregularities in the discharge speed of the recording head and irregularities in the carriage moving speed, because the direction in which dot landing deviates on a going trip opposes the direction in which dot landing deviates in a return trip.

Regarding generation of misregistration which would occur in recording by reciprocating scanning, it is difficult to control discharge timing in bidirectional printing because the value of misregistration is not fixed with respect to the direction in which the carriage moves. Further, since there may be variations in the distance between the recording head and the surface of the recording paper in the recording apparatus, it is difficult to control the dot landing positions in both going and returning (forward and reverse) scannings by adjusting discharge timing.

In reciprocating printing, dot landing position accuracy deteriorates for the above-described reasons. Thus, if the dispersion type gray scale pattern is employed in reciprocating printing, the possibility that irregularities of an image may occur increases.

Regarding the frequency with which the nozzle is used, if gray scale display is performed using the dot concentration type gray scale pattern and if the number of nozzles in the multinozzles is a multiple of the vertical size of the matrix of the gray scale pattern, as in the case of the first and second embodiments, the gray scale pattern is synchronized with the nozzles, increasing differences between the frequencies with which the nozzles are used. Consequently, dot landing position accuracy further deteriorates as the nozzles change with time, and irregularities of a recorded image further increase.

Figure 12:
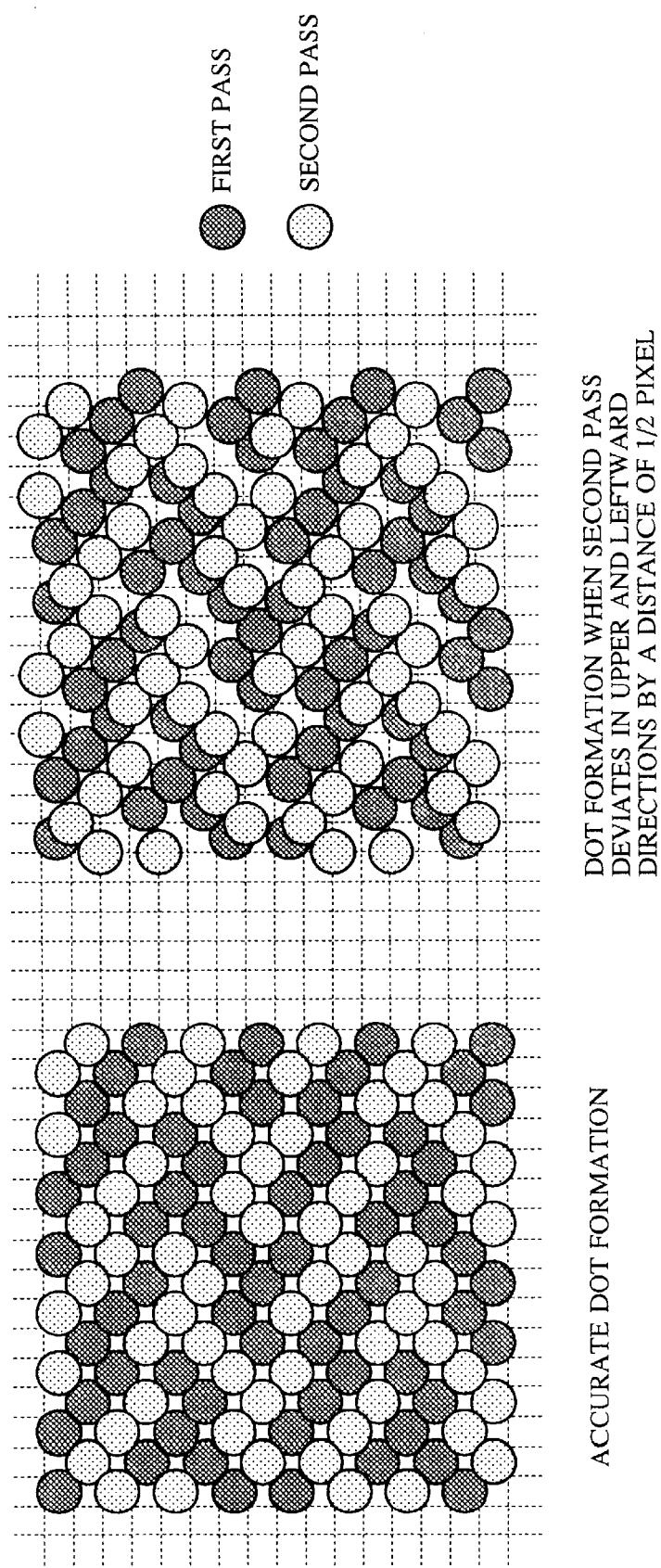
FIG. 12 illustrates an influence of deviation of dot landing positions on the dot dispersion type gray scale pattern.
Figure 13:
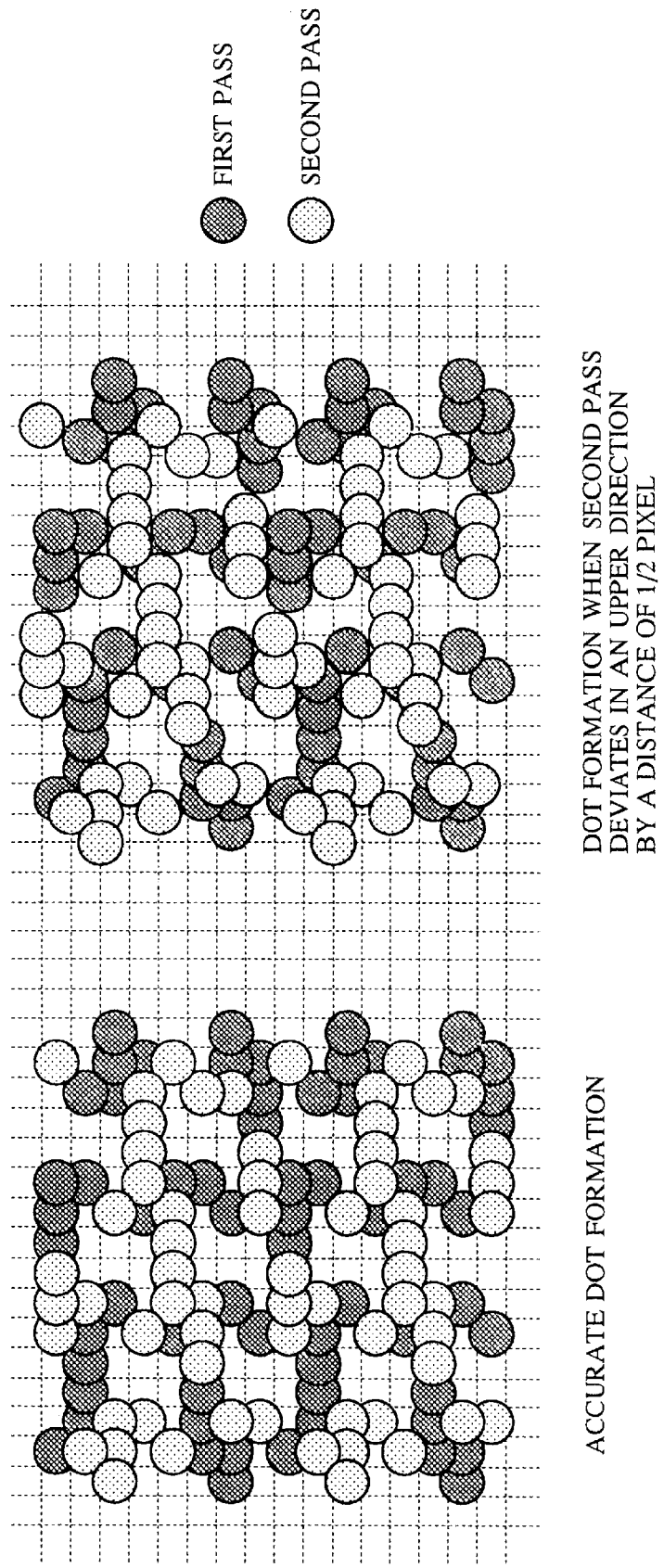
FIG. 13 illustrates a dot concentration type gray scale pattern which satisfies the limitations of FIG. 10.

When an image of 50% duty is printed using the dot dispersion type gray scale pattern shown in FIG. 2A by performing going printing in the first pass and return printing in the second pass according to a thinning mask pattern shown in FIG. 11, if dot positions are deviated in printing by a distance corresponding to ½ dot in the paper feed direction and horizontal direction, as shown in FIG. 12, non-printing portions are generated in an image, greatly deteriorating the image quality as compared with the case where dots are formed at accurate positions.

Where printing is performed in a similar manner to the above-described manner using the dot concentration type gray scale pattern shown in FIG. 10, good results, such as those shown in FIG. 13 in which dot concentration areas are slightly shifted, are obtained. In the obtained printed image, a reduction in the image quality can be restricted, although non-printing portions may be deformed.

Figure 27:
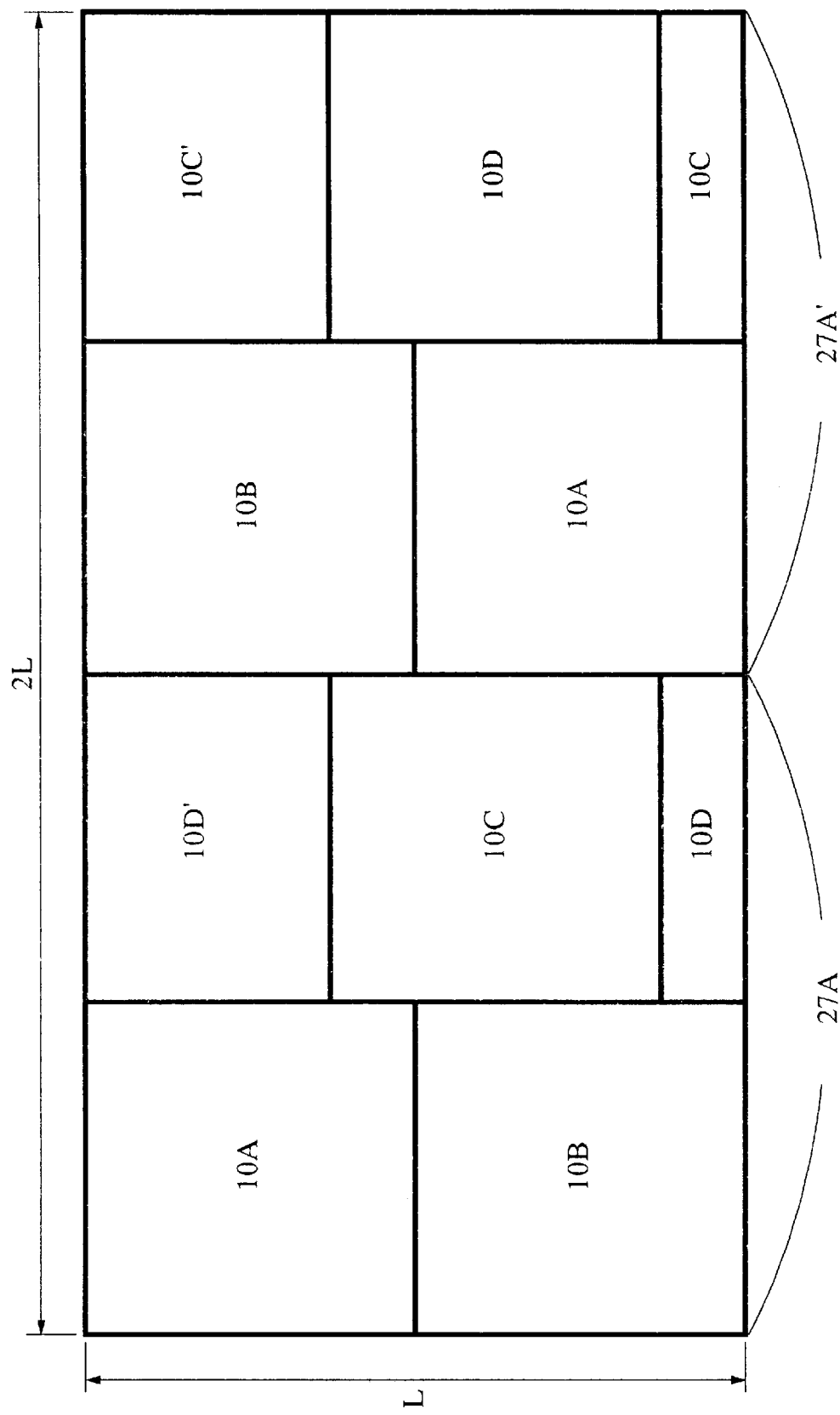
FIGS. 27 through 29 illustrate the gray scale pattern shown in FIG. 10.

As in the case of the gray scale pattern shown in FIG. 8, the gray scale pattern shown in FIG. 10 consists of 8×16 dots and is used to display 128 gray levels. There are four types of blocks, 10A, 10B, 10C and 10D in the gray scale pattern shown in FIG. 10, as shown in FIG. 27. In a block 27A formed of 8×8 dots, blocks 10D and 10D' can form a block similar to the other blocks when the lower portion of block 10D is connected to the upper portion of block 10D', as has been described in connection with FIG. 25. Blocks 10C and 10C in a block 27A' can also form a block similar to the other blocks. Thereafter, blocks divided into upper and lower portions are called blocks 10C and 10D.

Four types of blocks 10A, 10B, 10C and 10D are each a gray scale pattern which can display 16 gray levels of 4×4. Each of blocks 27A and 27A', consisting of 8×8 dots and formed of four blocks 10A, 10B, 10C and 10D, is capable of display of 64 gray levels. As shown in FIG. 27, the gray scale pattern shown in FIG. 10 has 8×16 dots to display 128 gray levels by combining two patterns which are the same with each other except that block 10A is switched by block 10B and that block 10C is switched by block 10D. A gray scale pattern in each block is shown in FIG. 28.

Figure 28:
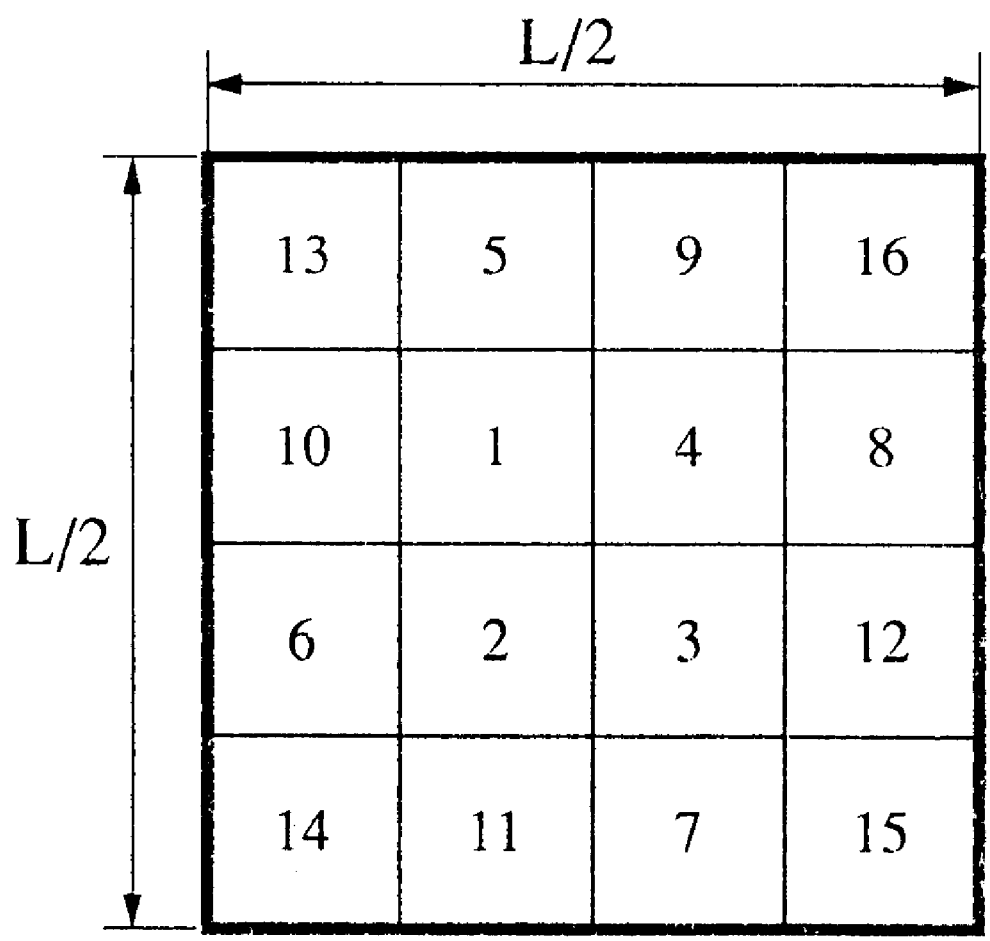

FIG. 28 shows a gray scale pattern in each of blocks 10A, 10B, 10C and 10D. Each of the blocks comprises a dot concentration type gray scale pattern, as shown in FIG. 28. In the gray scale pattern shown in FIG. 10, as the value of the input pixel data increases, dots to be recorded in each block increase in the order of blocks 10A, 10C, 10B and 10D. 64 gray levels are displayed by block 27A obtained by combining blocks 10A, 10B, 10C and 10D with each other. 128 gray levels can be displayed by combining block 27A with block 27A' having the same size as that of the block 27A and formed in the same manner except for the positions of the formed blocks 10A, 10B, 10C and 10D.

Figure 29:
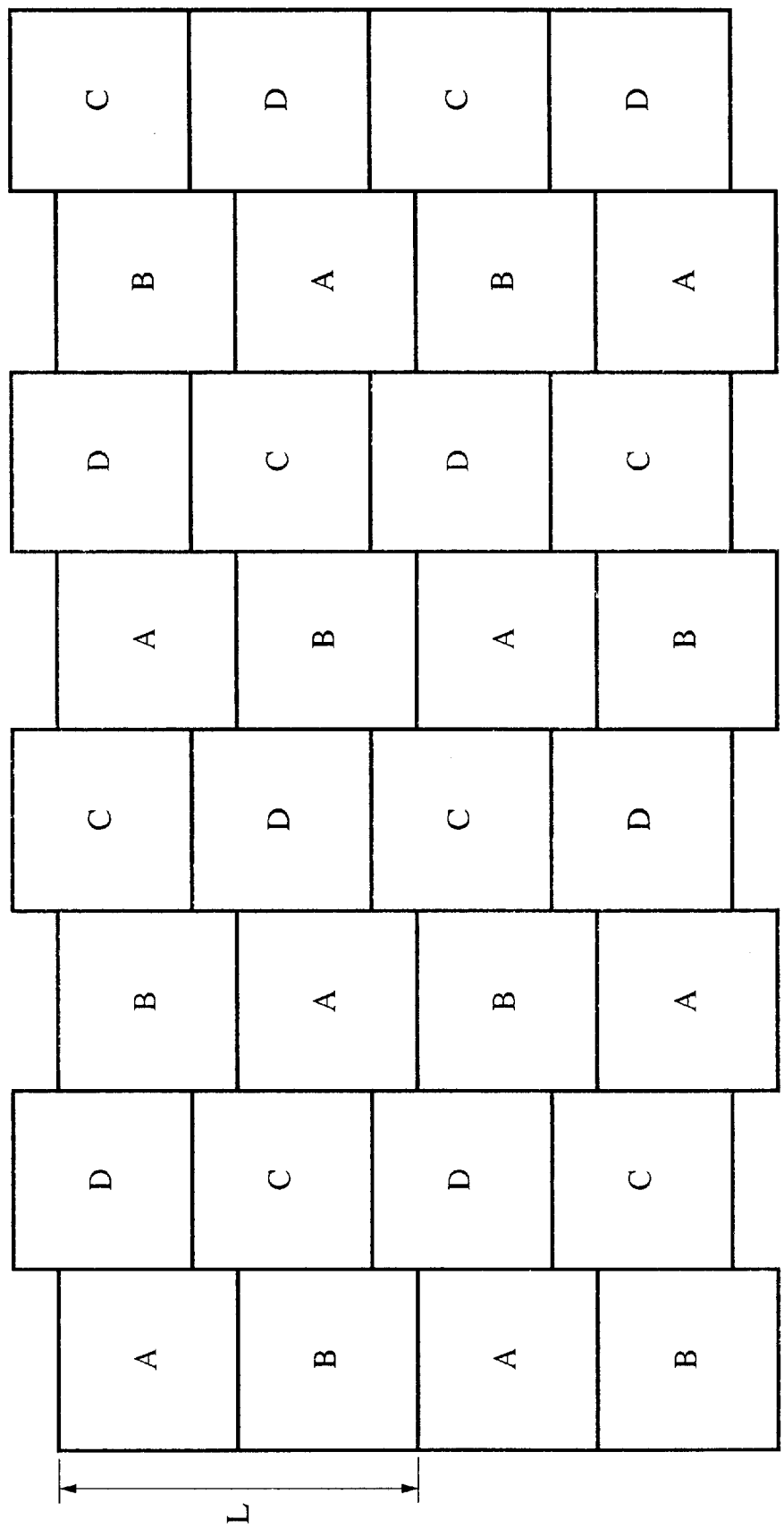

FIG. 29 schematically illustrates the positional relationship of the individual blocks in the recording results obtained when recording is performed with the gray scale pattern shown in FIG. 10. As mentioned above, blocks 10D and 10D' located below and above block 10C and block 10C and 10C' located below and above block 10D in FIG. 27 are each located adjacent to each other in the recording results to form a single block. Thus, the individual blocks are disposed at positions which deviate in the direction in which the multinozzles 602 shown in FIG. 17 are arrayed.

When the gray scale pattern shown in FIG. 10 is used, since the positions where dots are concentrated in individual block gray scale patterns shown in FIG. 27 scatter in the direction in which the multinozzles 602 shown in FIG. 17 are arrayed, the frequencies with which the multinozzles 602 are used become uniform, and continuity of the gray scale can be enhanced.

Figure 30:
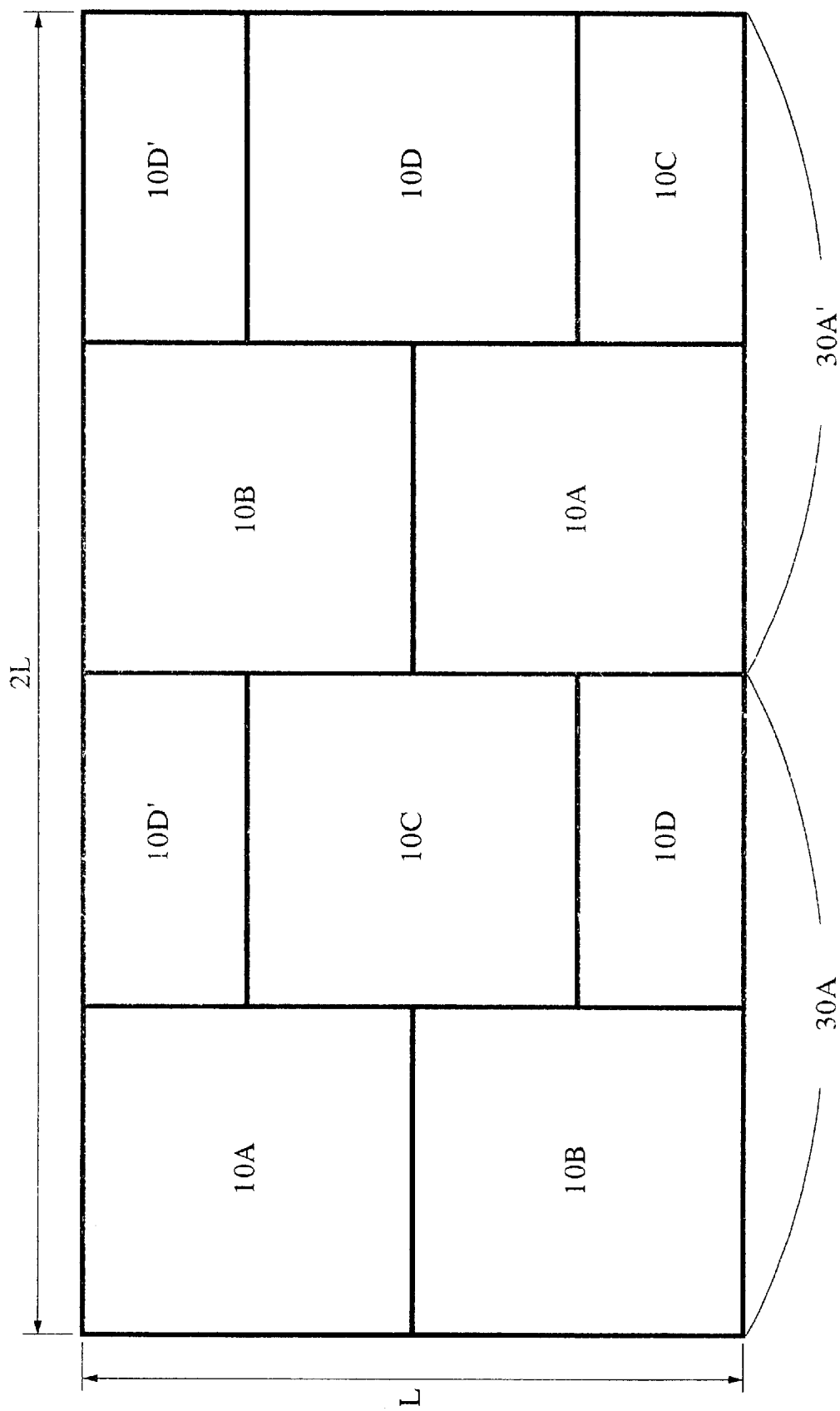
FIG. 30 illustrates another example of layout of individual blocks in the gray scale pattern shown in FIG. 10.

In the example shown in FIG. 27, a row of blocks 10A and 10B and a row of blocks 10C and 10D are disposed in such a manner that the central position of the gray scale pattern of the blocks 10A and 10B deviates from that of the blocks 10C and 10D by a distance corresponding to 1 dot or three dots. However, in the present invention, the central position of blocks 10A and 10B may deviate from the central position of blocks 10C and 10D by a distance corresponding to 2 dots, as shown in FIG. 30.

As will be understood from the foregoing description, where gray scale display is performed using the gray scale pattern shown in FIG. 10, since differences between the frequencies with which the nozzles are used are always 1 or below within the range defined by the gray scale pattern despite of the fact that the gray scale pattern shown in FIG. 10 is a dot concentration type gray scale pattern, variations in the amount of discharged ink, caused by differences between the frequencies with which the nozzles are used can be further restricted, thus restricting generation of irregularities of an image.

(Other Embodiments)

In the above embodiments, the ink jet recording apparatus has been described. However, the present invention can also be applied to the thermal recording method, the thermosensitive recording method or other recording methods capable of employing a multihead.

Among various types of ink jet recording apparatuses, the use of a recording apparatus of the type which employs an ink jet type recording head for forming a flying ink droplet by utilizing thermal energy for recording is preferable.

Typical configurations and principles of such ink jet heads are described in, for example, U.S. Pat. Nos. 4,723,129 and 4,740,796. Although there are on-demand type and continuous type, the on-demand type ink jet recording head is more preferable. In the on-demand type recording head, at least one driving signal for generating a rapid increase in the ink temperature to a value exceeding the nucleate boiling temperature of ink is applied in response to recording information to each of the electro-thermal transducers disposed in such a manner that they respectively correspond to the ink holding sheets or flow passages, so as to generate thermal energy and thereby cause film boiling to occur on the heat acting surface of the ink jet head. Bubbles are thereby formed in the liquid (ink) in one-to-one correspondence with the driving signals applied to the electro-thermal transducers. The ink is ejected from the discharge outlet by virtue of the growth and contraction of the bubble to form at least one droplet. At that time, the use of a driving signal having a pulse-like form is preferred because the pulse-like driving signal causes the bubble to grow and contract instantaneously and adequately, and ink can therefore be ejected in excellent response. Driving of the recording head by means of a pulse-like signal has been proposed in, for example, U.S. Pat. Nos. 4,463,359 and 4,345,262. If the conditions described in U.S. Pat. No. 4,313,124, which involves an increase in the temperature of the heat acting surface of the ink jet head, are adopted, even better recording is possible.

The recording head employed in the present invention may have the configuration (linear or right-angled liquid passages) disclosed in the above-mentioned specifications regarding the discharge ports, the liquid passages and the electro-thermal transducers. The recording head may also be constructed such that the heat acting portion is disposed in a bending area, like those disclosed in U.S. Pat. Nos. 4,558,333 and 4,459,600. The recording head employed in the present invention may also be that in which a slit provided for a plurality of electro-thermal transducers acts as a discharge portion thereof, as disclosed in Japanese Patent Laid-Open No. Sho 59-123670, or that in which an opening for absorbing pressure waves of thermal energy corresponds to the discharge portion, as disclosed in Japanese Patent Laid-Open No. Sho 59-138461. In other words, the present invention assures reliable and effective recording, no matter which type of recording head is employed.

The present invention can also be applied to a full-line type ink jet head having a length corresponding to the maximum width of the recording medium on which the ink jet apparatus can record. Such a recording head may be constructed by combining a plurality of ink jet heads to fulfil the length corresponding to the maximum recording medium width or as a single ink jet head unit.

The above-described serial type recording head to which the present invention can be applied includes one which is fixed to the apparatus body, one which is replaceable and which accomplishes electrical and ink supply connections to the apparatus body by the mounting thereof on the apparatus body and a cartridge type one in which an ink tank is integrally formed with the ink jet head.

Preferably, ink jet head discharge recovery means and auxiliary means may be incorporated in the ink jet apparatus according to the present invention for the purpose of ensuring more stable recording. Suitable examples of such means include a capping means, a cleaning means, a pressurizing or suction means for the ink jet head, a preliminary heating means which employs the electro-thermal transducers, other heating elements or a combination of the electro-thermal transducers and other heating elements, and a preliminary discharge means for performing discharge for purposes other than recording an image.

The above-described ink jet apparatus according to the present invention may also be of the type which incorporates a plurality of ink jet heads respectively corresponding to a plurality of different recording colors or densities. That is, the present invention can also be applied not only to an ink jet apparatus having a single recording mode in which recording is performed in only a single major color, such as black, but also to an apparatus having at least one recording mode selected from both a recording mode in which recording is performed in a plurality of different colors and a recording mode in which recording is performed in a full color obtained by mixing colors. In the latter apparatus, the ink jet head may be constructed as a single unit or by combining a plurality of ink jet heads.

In the above-described embodiments, the ink has been described as liquid ink. However, an ink which is in solid form at room temperatures or below and which softens or becomes liquid at room temperatures, may also be used. Alternatively, an ink which becomes liquid when applied with a recording signal may also be used because the temperature of the ink used in the ink jet process is generally controlled between 30° C. to 70° C. so as to adjust the viscosity of the ink to a predetermined range which ensures stable ejection. A solid ink which is normally in a solid form and liquefied by heating may also be used for the purpose of preventing an increase in the temperature by virtue of heat energy by utilizing that heat energy as an energy required to change the condition of the ink from a liquid form to a solid form or for preventing evaporation of the ink. In any way, an ink which is liquified by the presence of thermal energy, such as that which is liquefied in response to a recording signal and is ejected in the form of liquid ink or that which is liquefied in response to a recording signal but starts solidifying when it reaches the recording medium, may also be used. Such an ink may be retained in a liquid or solid form in a recessed portion of a porous sheet or through-hole in such a manner that it opposes an electro-thermal transducer, as described in Japanese Patent Laid-Open Nos. Sho 54-56847 or Sho 60-81260. However, the most effective method of retaining ink that can be employed in the present invention is the above-described nucleate boiling method.

The ink jet apparatus which can be employed in the present invention may be that used as an image output terminal for information processing equipment, such as a computer, a copying machine combined with, for example, a reader, or a facsimile apparatus having a transmission/reception function.

In the ink jet recording apparatuses, misregistration generated by the mechanical precision of the recording head or recording apparatus body in multipass or reciprocating printing can be readily absorbed, and differences between the frequencies with which the individual nozzles are used, which is the defect of the dot concentration type gray scale level exhibiting an advantage in terms of the gray scale characteristics, can be reduced. Consequently, variations in the nozzles characteristic to the ink jet recording apparatus can be reduced, thus reducing irregularities on an image and increasing the lifetime of a recording head.

What is claimed is:

1. A recording apparatus comprising:
   a recording head having an array of a plurality of recording elements for performing recording on a recording medium; and
   gray scale control means for performing multilevel recording by controlling, according to a predetermined gray scale pattern, a number of dots to be recorded in a single pixel formed of a plurality of recording dots formed by said recording elements of said recording head,
   wherein said predetermined gray scale pattern includes a plurality of blocks each having a plurality of discrete locations for forming dots and an area smaller than an area of said single pixel, and in which dots to be recorded in each of said plurality of blocks are recorded starting from almost a center location thereof, and as the number of dots recorded in said single pixel increases, the number of dots to be recorded in said plurality of blocks increases by a predetermined amount in a predetermined order such that consecutive dots are not recorded in the same block of said plurality of blocks.

2. The recording apparatus according to claim 1, wherein said recording head comprises an ink jet recording head for performing recording by discharging ink by drive of said recording elements.

3. The recording apparatus according to claim 2, wherein said recording head discharges ink as a consequence of changes in a state of the ink caused by thermal energy.

4. A gray scale pattern for use in multilevel recording performed by a recording apparatus including a recording head having an array of a plurality of recording elements for performing recording on a recording medium, said pattern being stored in a memory of said recording apparatus, and gray scale control means for performing multilevel recording by controlling a number of dots to be recorded in a pixel formed of a plurality of recording dots formed by said recording elements of said recording head, said gray scale pattern comprising:
   a plurality of blocks asymmetrically dispersed in the gray scale pattern, each of the said plurality of blocks having a plurality of discrete locations for forming dots and an area of said pixel, and in which dots to be recorded by a recording apparatus in said pixel increases starting from substantially a center location of a respective pixel in accordance with an increase in a gray scale pattern.

5. A recording method for use in gray scale recording by a recording apparatus including a recording head having an array of a plurality of recording elements for performing recording on a recording medium, and gray scale control means for performing multilevel recording by controlling a number of dots to be recorded in a single pixel formed of a plurality of recording dots formed by said recording elements of said recording head, said method comprising the steps of:
   providing a gray scale pattern including a plurality of blocks each having a plurality of discrete locations for forming dots and an area smaller than an area of said single pixel, and in which dots to be recorded in each of said plurality of blocks are recorded starting from almost a center thereof; and
   recording such that as the number of dots recorded in said single pixel increases, the number of dots to be recorded in said plurality of blocks increases by a predetermined amount in a predetermined order such that consecutive dots are not recorded in the same block of said plurality of blocks.

6. A recording apparatus for performing recording by a recording head having a plurality of recording elements, said apparatus comprising:
   gray scale means for performing multilevel recording by a number of recording dots in a single pixel formed of a plurality of dots formed by said recording elements of the recording head; and
   a gray scale pattern set according to each gray pattern in the single pixel,
   wherein a number of times of driving a recording element that is driven most often in a range defined by said gray scale pattern is not more than twice a number of times of driving another recording element that is driven least often in the range defined by said gray scale pattern.

7. The recording apparatus according to claim 6, wherein said recording elements in said range defined by said gray scale pattern are used n times only when 50% of all nozzles in said gray scale pattern are used at least −1 times.

8. The recording apparatus according to claim 6, wherein said gray scale pattern is of a dot concentration type.

9. The recording apparatus according to claim 6, further comprising the recording head, wherein said recording head comprises an ink jet recording head for performing recording by discharging ink by drive of said recording elements.

10. The recording apparatus according to claim 9, wherein each recording element comprises thermal energy generation means for supplying thermal energy to the ink, and wherein said recording head discharges the ink on the basis of changes in a state of the ink caused by thermal energy.

11. A recording method comprising the steps of:
    providing a recording head having a plurality of recording elements for recording a pixel with a plurality of dots according to a gray scale pattern, the pattern including a plurality of blocks subdividing the pixel, each block having a plurality of physically separate locations for forming dots and an area smaller than an area of the pixel; and
    driving the recording elements such that a number of times of driving a recording element that is driven most often in a range defined by the gray scale pattern to record the pixel is not more than twice a number of times of driving another recording element that is driven least often in the range defined by said gray scale pattern to record the pixel.

12. The recording method according to claim 11, wherein in said driving step, the recording elements in the range defined by the gray scale pattern are used n times only when 50% of all nozzles in said gray scale pattern are used at least −1 times where n is an integer.

13. The recording method according to claim 11, wherein said recording elements are driven to record the gray scale pattern as a dot concentration type.

14. The recording method according to claim 11, wherein during said providing step, the recording head comprises an ink jet recording head for performing recording by discharging ink by drive of the recording elements.

15. The recording method according to claim 14, wherein in said recording step the recording head discharges ink on the basis of changes in a state of the ink generated by thermal energy.

16. A dither matrix pattern for use in gray scale recording of an image performed by a recording apparatus using a recording head having an array of a plurality of recording elements for performing recording on a recording medium, the recording apparatus controlling the recording elements to perform recording, comprising:

a first block and a second block, each of the first block and the second block consisting of a plurality of concentration pattern blocks dispersed to correspond to an arraying direction in which the recording elements of the recording head are arrayed, each concentration pattern block having a dot concentration pattern in which a threshold increases starting from the center to the outer edge of the block, wherein the arrangement of the concentration pattern blocks differs between the first block and the second block.

17. The dither matrix pattern according to claim 16, wherein the concentration pattern blocks in each of the first block and the second block forming the dither matrix pattern are arranged by dispersing the central positions of the concentration pattern blocks along the arraying direction.

18. The dither matrix pattern according to claim 16, wherein the concentration pattern blocks are arranged in different sequences, according to the threshold, between the first block and the second block.

19. A recording apparatus for use with a recording head having an array of a plurality of recording elements for performing recording on a recording medium, comprising:

gray scale recording control means for performing gray scale recording using the recording head by controlling, according to a dither matrix pattern, the recording elements of the recording head to record dots in an area of the recording medium on the basis of a comparison of a gray scale level indicated by data for use in recording with a threshold in the dither matrix pattern, wherein the dither matrix pattern includes a first block and a second block, each of the first block and the second block consisting of a plurality of concentration pattern blocks dispersed to correspond to an arraying direction in which the recording elements of the recording head are arrayed, each concentration pattern block having a dot concentration pattern in which a threshold increases starting from the center to the outer edge of the block, and wherein the arrangement of the concentration pattern blocks differs between the first block and the second block of the dither matrix pattern.

* * * * *

UNITED STATES PATENT AND TRADEMARK OFFICE
CERTIFICATE OF CORRECTION

PATENT NO. : 6,655,773 B2
DATED : December 2, 2003
INVENTOR(S) : Fumihiro Gotoh et al.

It is certified that error appears in the above-identified patent and that said Letters Patent is hereby corrected as shown below:

<u>Title page,</u>
Item [56], References Cited, U.S. PATENT DOCUMENTS, insert:
-- 4,631,548 A   12/1986   Milbrandt et al. ...........347/15 --.

FOREIGN PATENT DOCUMENTS,
"       JP 54056847         5/1979
        JP 59123670         7/1984
        JP 59138461         8/1984
        JP 60071260         4/1985"
should read
--      JP 54-056847        5/1979
        JP 59-123670        7/1984
        JP 59-138461        8/1984
        JP 60-071260        4/1985 --.

<u>Column 1,</u>
Line 12, "apparatus" should read -- apparatuses --; and
Line 50, "clot" should read -- dot --.

<u>Column 4,</u>
Line 42, "illustrates" should read -- illustrate --.

<u>Column 7,</u>
Line 29, "Lifetime" should read -- lifetime --.

<u>Column 9,</u>
Line 36, "having nozzles" should read -- having 32 nozzles --; and
Line 46, "misregister" should read -- misregistration --.

<u>Column 10,</u>
Line 20, "lines, is" should read -- lines is --.

<u>Column 12,</u>
Line 14, "10 C" should read -- 10 C' --.

UNITED STATES PATENT AND TRADEMARK OFFICE
CERTIFICATE OF CORRECTION

PATENT NO. : 6,655,773 B2
DATED : December 2, 2003
INVENTOR(S) : Fumihiro Gotoh et al.

It is certified that error appears in the above-identified patent and that said Letters Patent is hereby corrected as shown below:

Column 16,
Line 62, "-1" should read -- n-1 --.

Signed and Sealed this

Tenth Day of August, 2004

JON W. DUDAS
*Acting Director of the United States Patent and Trademark Office*